US008862799B2

(12) United States Patent
Rastogi et al.

(10) Patent No.: US 8,862,799 B2
(45) Date of Patent: Oct. 14, 2014

(54) TECHNIQUE FOR IMPLEMENTING VIRTUAL FABRIC MEMBERSHIP ASSIGNMENTS FOR DEVICES IN A STORAGE AREA NETWORK

(75) Inventors: Gaurav Rastogi, Mountain View, CA (US); Ramsundar Janakiraman, Sunnyvale, CA (US); Kalyan Ghosh, Santa Clara, CA (US); Badri Ramaswamy, Saratoga, CA (US); Joy J. Chatterjee, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 741 days.

(21) Appl. No.: 12/336,434

(22) Filed: Dec. 16, 2008

(65) Prior Publication Data

US 2009/0094354 A1 Apr. 9, 2009

Related U.S. Application Data

(63) Continuation of application No. 11/332,747, filed on Jan. 12, 2006, now Pat. No. 7,484,021, which is a continuation-in-part of application No. 11/261,426, filed on Oct. 27, 2005, now abandoned.

(30) Foreign Application Priority Data

Nov. 23, 2005 (IN) .......................... 1068/KOL/2005

(51) Int. Cl.
*G06F 3/00* (2006.01)
*H04L 29/08* (2006.01)
*H04L 12/24* (2006.01)
*H04L 12/931* (2013.01)

(52) U.S. Cl.
CPC ........ *H04L 41/0816* (2013.01); *H04L 67/1097* (2013.01); *H04L 41/12* (2013.01); *H04L 41/0893* (2013.01); *H04L 49/354* (2013.01); *H04L 49/357* (2013.01)
USPC .............................. 710/74; 709/223; 709/225

(58) Field of Classification Search
None
See application file for complete search history.

(56) References Cited

U.S. PATENT DOCUMENTS 6,421,723 B1 * 7/2002 Tawil ............................ 709/224
6,839,746 B1   1/2005 Muthiyan et al.

(Continued)

FOREIGN PATENT DOCUMENTS

WO    WO2006138290    12/2006

OTHER PUBLICATIONS

EP Search Report dated Oct. 15, 2010, from EP Application No. 0683310.8.

(Continued)

*Primary Examiner* — Idriss N Alrobaye
*Assistant Examiner* — Dayton Lewis-Taylor

(57) ABSTRACT

A technique is provided for facilitating fabric membership login for an N_Port of a storage area network. A communication from a network node is received. The communication may include a portion of criteria associated with the N_Port. Using at least a portion of the portion of criteria, a virtual fabric identifier corresponding to a virtual fabric which is associated with the N_Port may be automatically identified. Fabric configuration information, which includes the virtual fabric identifier, may be automatically provided to the network node. A fabric login request from the N_Port to login to the virtual fabric may then be received. According to a specific embodiment, the communication may be transmitted from a network node to an F_Port on a Fiber Channel switch. When the N_Port received the fabric configuration information from the F_Port, the generating, using at least a portion of the received fabric configuration information, a fabric login request message may be generated by the N_Port which includes a fabric login request for the N_Port to login to the virtual fabric corresponding to the virtual fabric identifier. In at least one implementation, the N_Port and/or F_Port may be configured or designed to support trunking functionality.

12 Claims, 10 Drawing Sheets

(56) References Cited

U.S. PATENT DOCUMENTS

| | | | |
|---|---|---|---|
| 7,275,103 B1 * | 9/2007 | Thrasher et al. | 709/224 |
| 7,484,021 B2 | 1/2009 | Rastogi et al. | |
| 8,060,630 B1 * | 11/2011 | Jancaitis et al. | 709/229 |
| 2003/0103504 A1 | 6/2003 | Dugan et al. | |
| 2003/0118053 A1 | 6/2003 | Edsall et al. | |
| 2004/0100910 A1 | 5/2004 | Desai et al. | |
| 2004/0221047 A1 | 11/2004 | Grover et al. | |
| 2005/0036499 A1 * | 2/2005 | Dutt et al. | 370/401 |
| 2005/0198523 A1 | 9/2005 | Shanbhag et al. | |
| 2005/0234941 A1 * | 10/2005 | Watanabe | 707/100 |
| 2006/0092932 A1 | 5/2006 | Ghosh et al. | |
| 2006/0130052 A1 * | 6/2006 | Allen et al. | 717/172 |
| 2007/0033366 A1 | 2/2007 | Eisenhauer et al. | |
| 2008/0028096 A1 | 1/2008 | Henderson et al. | |

OTHER PUBLICATIONS

US Non-Final Office Action dated Sep. 11, 2007, from related U.S. Appl. No. 11/332,747.

US Non-Final Office Action dated Apr. 17, 2008, from related U.S. Appl. No. 11/332,747.

US Notice of Allowance dated Sep. 17, 2008, from related U.S. Appl. No. 11/332,747.

EP Extended Search Report dated Aug. 6, 2009, from EP Application No. 06838310.8.

PCT International Search Report and Written Opinion dated Sep. 25, 2007, from Int'l Application No. PCT/US06/45279.

Carlson, et al., INCITS Working Draft Proposed American National Standard for Information Technology, "FIBRE Channel Link Services (FC-LS) Rev. 1.2", Jun. 7, 2005 (227 pages).

Cisco MDS 9000 Family Fabric Manager Configuration Guide, Release 2.x Sep. 2005 (515 pages).

Claudio DeSanti, "VF N_Port Support, T11/04/494v1", Sep. 30, 2004 (14 pages).

* cited by examiner

TECHNIQUE FOR IMPLEMENTING VIRTUAL FABRIC MEMBERSHIP ASSIGNMENTS FOR DEVICES IN A STORAGE AREA NETWORK

RELATED APPLICATION DATA

This application is a continuation application, pursuant to the provisions of 35 U.S.C. 120, of prior U.S. patent application Ser. No. 11/332,747 entitled "TECHNIQUE FOR IMPLEMENTING VIRTUAL FABRIC MEMBERSHIP ASSIGNMENTS FOR DEVICES IN A STORAGE AREA NETWORK" by Rastogi et al, filed on Jan. 12, 2006, which is a continuation-in-part application, pursuant to the provisions of 35 U.S.C. 120, of prior U.S. patent application Ser. No. 11/261,426 entitled "DYNAMIC PORT VSAN MEMBERSHIP FUNCTIONAL AND DESIGN SPECIFICATION" by Ramaswamy et al., filed on Oct. 27, 2005. Each of these applications is incorporated herein by reference in its entirety and for all purposes.

FIELD OF INVENTION

This invention pertains to Fibre Channel networks and the devices and methods implemented therein. More specifically, the invention pertains to devices and methods for implementing virtual fabric membership assignments for devices in a storage area network.

BACKGROUND

In recent years, the capacity of storage devices has not increased as fast as the demand for storage. Therefore a given server or other host must access multiple, physically distinct storage nodes (typically disks). In order to solve these storage limitations, the Storage Area Network ("SAN") was developed. Generally, a storage area network is a high-speed special-purpose network that interconnects different data storage devices and associated data hosts on behalf of a larger network of users. A SAN may use various types of network traffic, but more often than not it employs Fibre Channel frames.

Traditionally, designers of storage area networks built separate fabrics, otherwise known as SAN islands. For example, a business might employ one SAN island for human resources applications, another SAN island for engineering applications, another for marketing, etc. Each SAN island contains a physically isolated switch or a group of switches for connecting hosts to storage devices. While this approach may enforce separation of data between various groups in an organization, it frequently under utilizes hardware and management resources.

More recently, some switches such as the MDS9000 family of switches from Cisco Systems, Inc. of San Jose, Calif. have provided the capability to deploy virtual SANs ("VSANs"). With this approach, a multiple SAN islands may be collapsed to a single physical infrastructure, thereby reducing hardware costs and improving manageability while maintaining the stability and traffic isolation of the SAN island model. Each VSAN is logically separate and may be assigned to a separate group, e.g., marketing, engineering, etc. In this collapsed fabric model, some or all switches and inter-switch links in the fabric carry traffic for multiple VSANs.

In conventional Fibre Channel, each device (e.g., hosts, storage devices and switches) is identified by an unique eight (8) byte wide physical world wide name ID (PWWN) assigned by the manufacturer. When the Fibre Channel devices are interconnected to form a SAN, the PWWN (along with other parameters) is used to identify each device. Each device may also have and associated unique node world wide name ID (NWWN).

Fibre Channel frames are used for communication among the devices in the SAN. The PWWN, however, is not used by the frames. Instead the Fibre Channel Port of each end device (hosts and storage devices) is addressed via a three (3) byte Fibre Channel address (or FCID), allocated dynamically to the end devices by the fabric. A unique FCID is assigned to a host device or disk device when the device logs in to the fabric. Additionally, each switch in the fabric is assigned a specific domain by the domain manager when the switch is connected to the fabric. All the devices connected to a given switch will have the DomainID of the switch as the first byte of their FCIDs. This "Domain" value is used for routing the frames within the fabric. Each FC frame header will include an SID field representing the source FCID, and a DID field representing the destination FCID.

Until now, only the interconnect ports (called "E_Ports") that connect the VSAN switches could be configured to carry the traffic of multiple VSANs. Therefore, host bus adaptors ("HBAs") or other interfaces in hosts (e.g., N_Ports) attached to F_Ports or FL_Ports could be configured in one VSAN only.

The VSAN of the attached switch port (also called the "port VSAN") is implicitly assigned to the HBA and all traffic transmitted or received by the HBA belongs to that VSAN. In this approach, all traffic between the HBA and the switch port is transmitted in standard Fibre Channel frame format, commonly termed "untagged format."

This should be contrasted with the format of frames exchanged between trunking E_Ports, which are encapsulated in Extended Inter-Switch Link ("EISL") format, commonly termed "tagged format". The format specifically identifies the VSAN of each frame and thereby allows enforcement of VSAN specific security policies, quality of service, etc. The use of trunking E_Ports and the EISL format is described in detail in US Patent Publication No. US-2003-0118053-A1, and U.S. patent application Ser. No. 10/979,886, previously incorporated by reference.

Additional information relating to SAN communication protocols are described in the following references, each of which is incorporated herein by reference in its entirety for all purposes: (1) "VF N_Port Support, T11/04-494v1," by Claudio DeSanti, American National Standards Institute (INCITS), September 2004, www.t11.org; (2) "Fibre Channel Link Services (FC-LS) Rev 1.2," by Carlson et al., American National Standards Institute (INCITS), Jun. 7, 2005; www.t11.org. For reference purposes, the "VF N_Port Support, T11/04-494v1" may herein be referred to as the "Exchange Virtual Fabric Parameters (EVFP) protocol" standard or simply the "EVFP protocol" standard; and the "Fibre Channel Link Services (FC-LS) Rev 1.2" may herein be referred to as the "FC-LS protocol" standard.

Conventional Fibre Channel VSAN implementations typically require that node devices employ multiple HBAs to connect to multiple switchports—one for each supported VSAN—to achieve multi-homing (participation in multiple VSANs). This redundancy is wasteful. While the deployment of multiple VSANs on a common topology represents a significant advance in storage area network technology, the requirement that a node have a separate physical interface for each of its VSANs presents a significant waste of resources.

Additionally, even in embodiments such as those described in U.S. patent application Ser. No. 10/979,886 where trunking mechanisms are employed to allow multiple HBAs of a given node to be configured in multiple VSANs via a single physical interface and associated F_Port, such embodiments typically require that the node be adapted to include additional mechanisms for allowing each HBA to know its respective VSAN association, and to provide such information to the F_Port during the FLOGI process. In at least some of these embodiments, if a given node or HBA does not include such additional mechanisms, the FLOGI process may fail and/or the use of trunking mechanisms may be disabled, either of which may be undesirable.

Therefore, an improved protocol and apparatus design to provide more efficient use of N_Port and F_Port resources is needed.

SUMMARY

Various aspects of the present invention are directed to different methods, systems, switches, and computer program products for implementing dynamic virtual SAN (VSAN) configuration of at least one N_Port in a storage area network. According to at least one embodiment, an N_Port may be identified using a portion of criteria associated with the N_Port. According to different embodiments, the portion of criteria may include various information relating to the N_Port such as, for example: PWWN information, NWWN information, FCID information, QoS criteria, node ID information, OUI information, vendor specific information; etc. Using the portion of information, a VSAN association for the N_Port may be automatically and dynamically determined and/or configured. In one implementation, the technique of the present invention may be implemented at a Fibre Channel switch.

Other aspects of the present invention are directed to different methods, systems, switches, and computer program products for facilitating fabric membership login for an N_Port of a storage area network. A communication from a network node is received. The communication may include a portion of criteria associated with the N_Port. Using at least a portion of the portion of criteria, a virtual fabric identifier corresponding to a virtual fabric which is associated with the N_Port may be automatically identified. Fabric configuration information, which includes the virtual fabric identifier, may be automatically provided to the network node. A fabric login request from the N_Port to login to the virtual fabric may then be received. According to a specific embodiment, the communication may be transmitted from a network node to an F_Port on a Fibre Channel switch. When the N_Port receives the fabric configuration information from the F_Port, at least a portion of the received fabric configuration information may be used to generate a fabric login request message at the N_Port which includes a fabric login request for the N_Port to login to the virtual fabric corresponding to the virtual fabric identifier. In at least one implementation, the N_Port and/or F_Port may be configured or designed to support trunking functionality.

Additional objects, features and advantages of the various aspects of the present invention will become apparent from the following description of its preferred embodiments, which description should be taken in conjunction with the accompanying drawings.

DETAILED DESCRIPTION

Introduction

As indicated, one aspect of the present invention pertains to trunking. Trunking allows a single port and associated link to carry traffic for multiple different virtual groups of network devices (e.g., multiple VSANs). Thus, a single physical infrastructure can support these separate groups, each of which may require its own security policy, quality of service parameters (QoS), communications protocols, etc. And, as explained in US Patent Publication No. US-2003-0118053-A1, VSANs may also be designed to support MPLS in Fibre Channel infrastructures.

Another aspect of the present invention relates to the dynamic assignment of port VSAN membership. In at least one implementation, the dynamic assignment of port VSAN membership may be used to allow N_Port-VSAN (or Host-VSAN) configurations to be dynamically assigned at the F_Port based on selected criteria such as, for example: PWWN, NWWN, FCID, QoS criteria, node ID, OUI, vendor specific information, and/or any other information or criteria which can be passed to the F_Ports via the FC fabric.

In the Fibre Channel standard, multiple types of ports are defined. These include N_Ports, F_Ports, and E_Ports. N_Ports reside in network end nodes such as hosts and disks. According to different embodiments, N_Ports may be associated with a variety of different host-associated entities at a network device such as, for example: physical HBAs, virtual HBAs, physical hosts (PHosts), virtual hosts (VHosts), etc.

F_Ports reside on fabric switches and connect to N_Ports to provide links between nodes and fabric switches. E_Ports are used for links between fabric switches, inter-switch links (ISLs). To date only E_Ports have been designed to carry traffic for multiple VSANs.

The present invention allows for an improved SAN design in which the VHosts or other host-associated entities can be configured in multiple VSANs. In this manner, multi-homing is achieved even while attaching a single N_Port to a single F_Port. This improves the utilization factor of bandwidth in VHosts (and the attached switch ports), reducing the overall port count requirement in the SAN, and hence, reducing the overall Total Cost of Ownership (TCO). One example application for trunking with VHosts is the tape backup application where instead of having one HBA for each VSAN to be backed up, one HBA may be used for backup of multiple VSANs.

Figure 1:
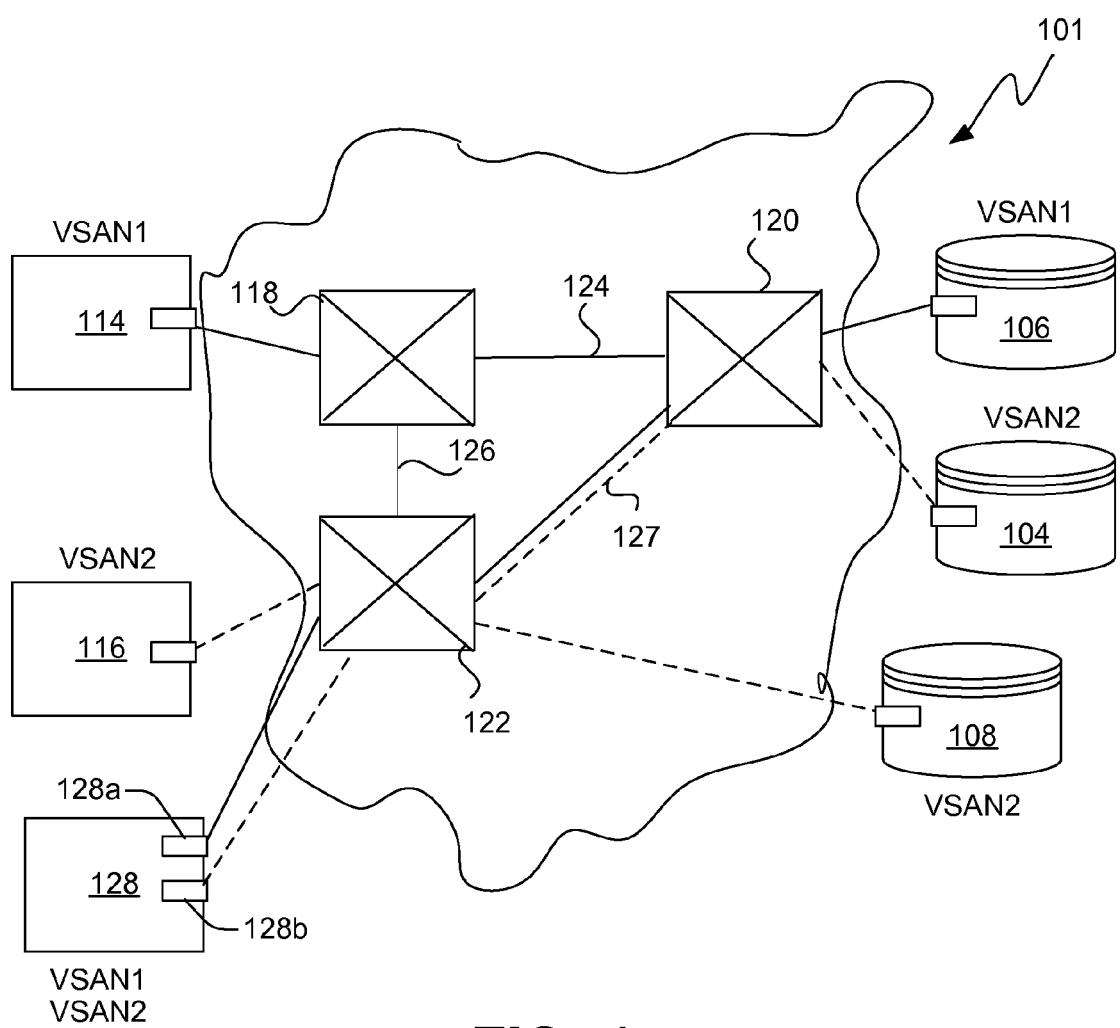
FIG. 1 is a diagram of a simple storage area network including a storage area network fabric and associated end nodes, which belong to two different VSANs.

FIG. 1 depicts a simple storage area network including a storage area network fabric 101 and associated end nodes. These nodes include hosts 114, 116, and 128, as well as storage disks 104, 106, and 108. The hosts may be servers or other computers requiring access to the data on the disks. Fabric 101 is comprised of switches 118, 120, and 122 coupled by inter-switch links 124, 127, and 126. These switches run a storage area network protocol such as Fibre Channel, which provides communication between the nodes via Fibre Channel frames.

As indicated above, a single infrastructure such as fabric 101 can support multiple VSANs, each associated with a distinct group of nodes. In the example of FIG. 1, two VSANs are implemented on the storage area network, VSAN1 and VSAN2. The nodes belonging to VSAN1 are hosts 114 and 128 and disk 106. All three switches have dedicated ports that support traffic on VSAN1. The nodes belonging to VSAN2 are hosts 116 and 128, as well as disks 104 and 108. Only switches 120 and 122 allow traffic on both VSAN1 and VSAN2. Switch 118 is dedicated to traffic on VSAN1. Note that links carrying traffic on VSAN1 are indicated by solid lines while links carrying traffic on VSAN2 are indicated by dashed lines.

Each link has an associated port. Inter-switch links employ Fibre Channel E_Ports. Fabric ports (F Ports) are ports on switches that communicate over links with node ports (N_Ports). To date, the ability to carry traffic for multiple VSANs over a single link has been reserved for inter-switch links supporting EISL, as mentioned above. In some contexts, such E_Ports are referred to trunking E_Ports or "TE_Ports." It is important to note that in current technology, as depicted in FIG. 1, trunking is limited to inter-switch links. Links between N_Ports and F_Ports are necessarily non-trunking. As indicated, this presents a burden if a particular node needs to communicate on multiple VSANs. For example, as depicted in FIG. 1, node 128 belongs to both VSAN1 and VSAN2. To allow for this, hosts 128 must include separate physical ports (e.g., 128a, 128b) for each VSAN. Similarly, each switch must provide a separate F_Port for each VSAN over which it and its associated node will communicate. This situation is depicted in switch 122 of fabric 101.

Figure 2:
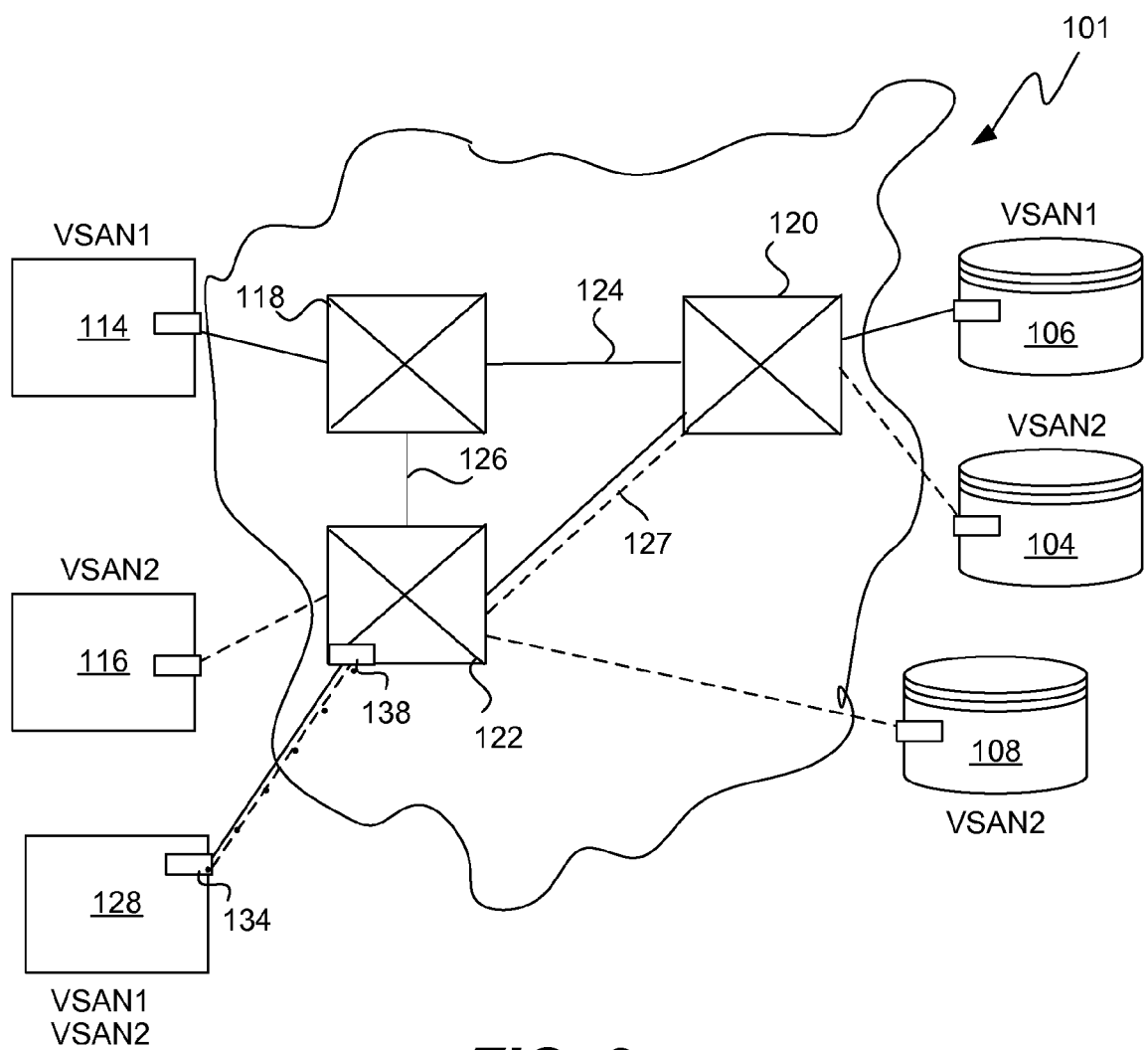
FIG. 2 is a diagram of a simple storage area network including a storage area network fabric and associated end nodes employing trunking N_Ports, which support traffic for two different VSANs.

To remedy this problem, one aspect of the present invention provides trunking N_Ports (TN_Ports) and trunking F_Ports (TF_Ports). These allow a single port other node interface to communicate with a single F_Port and provide edge traffic for two or more separate VSANs over a single link. This is shown in FIG. 2 where host 128, which belongs to both VSAN1 and VSAN2, contains a single physical port 134 connected to switch 122 via a link 136. This link is coupled to a trunking F_Port 138 on switch 122. As shown, link 136 carries traffic for both VSAN1 and VSAN2, and is thus deemed a trunking link. The principal difference between the networks depicted in FIGS. 1 and 2 is in the use of a single port 134 and a single F_Port 138 for communications between node 128 and switch 122, which communications may include traffic on both VSAN1 and VSAN2.

Various techniques for implementing multi-homing in node ports and fabric ports are within the scope of this invention. Some will be described the following sections. Typically, a TN_Port will include some control logic that can set up and initialize multiple virtual interfaces in a single node port. The control logic will need to communicate with corresponding logic on a trunking fabric port to negotiate and identify supported VSANs on the common link. The control logic may also communicate and negotiate to the extent needed state changes in existing trunk links. Such changes may include conversion from trunking to non-trunking, change in the list of supported or available VSANs, changes from non-trunking to trunking, etc.

In a specific embodiment, the control logic initially determines whether its peer fabric port supports or currently permits establishment of VSANs and/or trunking. It may use a conventional node login procedure for this purpose, e.g., FLOGI in the case of Fibre Channel. If it is determined that the fabric port cannot or currently does not support trunking, then it may configure the TN_Port to act as a conventional N_Port which does not explicitly recognize VSANs. If the control logic does find that its peer F_Port supports and permits trunking, it may then negotiate with the F_Port to determine which VSANs will be supported in the trunking link.

In this embodiment, the fabric port will similarly contain control logic for confirming that it supports trunking and for negotiating appropriate parameters (list of supported VSANs for the link, etc.) with the TN_Port. Appropriate functional designs for the TN_Port and TF_Port will be described below.

Functional Design of a TN_Port

As indicated, a Fibre Channel node device (e.g., a host bus adaptor) that supports trunking is termed a Trunking N port (TN_Port) herein. Such a device when attached to a switch-port in TF_Port mode can transmit and receive frames in one or more VSANs over the same physical link. In one embodiment, this is accomplished when using the EISL frame format.

Figure 3:
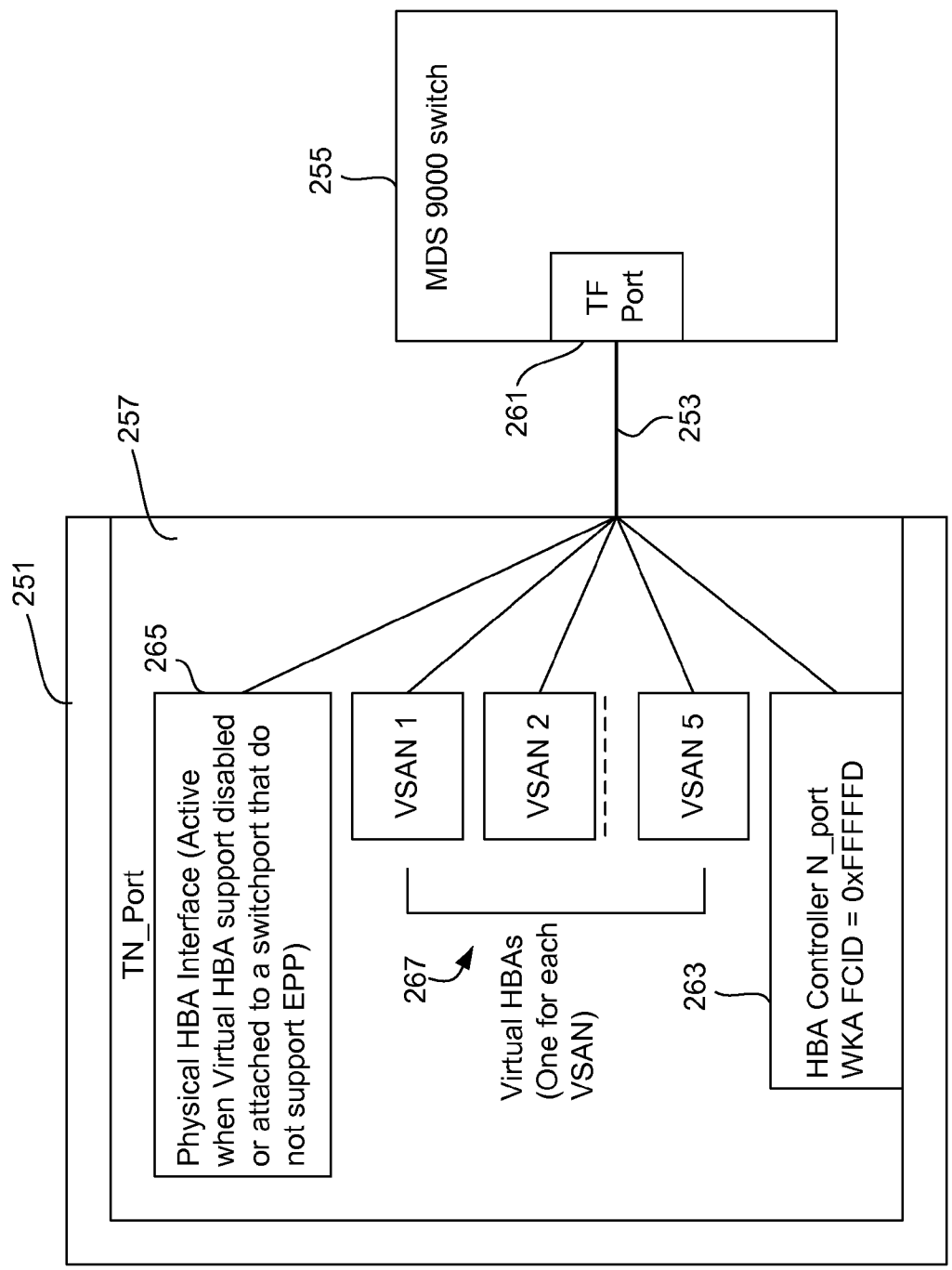
FIG. 3 is a block diagram showing various functional components of trunking N_Port in accordance with an embodiment of this invention.

One example of a TN_Port model is shown in FIG. 3. As shown there, a fabric switch 255 is coupled to a node 251 by a Fibre Channel link 253. Data transmission and management of the link is provided by a fabric port 261 in switch 255 and a node port 257 in node 251. These are configured as trunking ports having functionality described herein.

In the depicted model, TN_Port 257 includes three types of logical entities: an HBA Controller N_Port 263, a Physical HBA interface 265, and one or more virtual HBA interfaces (one for each VSAN configured) 267. Each of these logical entities exchanges frames over the same physical link 253 attached to the TN_Port. The physical link 253 can receive frames specifying a VSAN or other virtual fabric (in for example EISL format). The TN_Port 257 can operate in various modes as explained below. Even if it is in a mode that does not support trunking, it can implicitly support a single VSAN, as with current technology.

The HBA Controller N_Port 263 is a logical entity that is responsible for communicating with attached TF_Port 261 for configuration and management of trunking feature on TN_Port 257. It may accomplish this using any appropriate communication protocol. In a specific example detailed below, the configuration and management communications take the form of Fibre Channel exchanges using the Exchange Peer Parameter (EVFP) protocol. During these communications, the entity may behave like an N_Port with a well-known address, but it does not take part in data traffic. Thus, the HBA Controller N_Port 263 may be given a well-known address (WKA), e.g., the value hex FFFFFD. It may also be given a unique VSAN tag or ID (e.g., 4094) to use during these configuration and management communications.

A virtual HBA interface 267 is a logical entity of the TN_Port that mimics the functionality of a physical N_Port attached to an F_Port, but exchanges traffic in one VSAN only. Configuration exchanges, as described below, are established to specify the number and identities of virtual HBA interfaces 267. The VSAN IDs are assigned by the controller 263 to individual virtual HBA interfaces based upon parameter values established during set up with the TF_Port 261. A WWN is assigned by node device 251.

Typically, each TN_Port has the ability to instantiate one or more such virtual HBAs, one for each configured VSAN. Three virtual HBA interfaces 267 are shown in TN_Port 257. Each has the ability to apply its own VSAN tag to outgoing frames. Each also has the ability to process incoming frames sorted to it based on VSAN tag. Applications running on node 251 communicate with individual ones of the virtual HBA interfaces 267 based on their participation in the various supported VSANs. In some embodiments presented herein, the virtual HBA interfaces 267, each perform FLOGI in the manner of a conventional N_Port and take part in data traffic in the configured VSAN.

All frames transmitted and received by the virtual HBAs 267 are carried over the same physical link 253 between the TN_Port 257 and the attached F_Port 261. If link 253 is operational in trunking, all frames are tagged in EISL format (or other VSAN aware format); otherwise, all frames are untagged.

The Physical HBA Interface 265 is an optional logical entity that mimics the functionality of a physical N_Port attached to an F_Port but is not VSAN aware. It comes into play when either virtual HBA support of the TN_Port is disabled or the attached F_Port does not support VSANs, as well as a communication protocol for configuring VSANs on N_Port 257. This interface is not used when any of the virtual HBAs 267 are instantiated and active. Most commonly, this interface is used when the TN_Port is attached to a switch that is not VSAN aware or when the applications running on node 251 do not support virtual HBA interfaces.

When activated, Physical HBA Interface 265 exchanges all traffic originating with and received by TN_port 257. All such traffic is untagged. In all other aspects, data transfer on interface 265 resembles that on conventional HBAs, which have no knowledge of VSANs. For Physical Interface 265, a VSAN ID may be implicitly assigned by the F_Port, and a WWN is assigned by node device 251.

In some implementations, Physical HBA interface 265 may be unnecessary. One such implementation could, for example, employ at least one instance of block 267 and this could also perform the function of the Physical HBA when needed. Similarly, the HBA controller block 263 is also shown as one possible way to implement the functionality required. It may not be required in alternate implementations.

Figure 4:
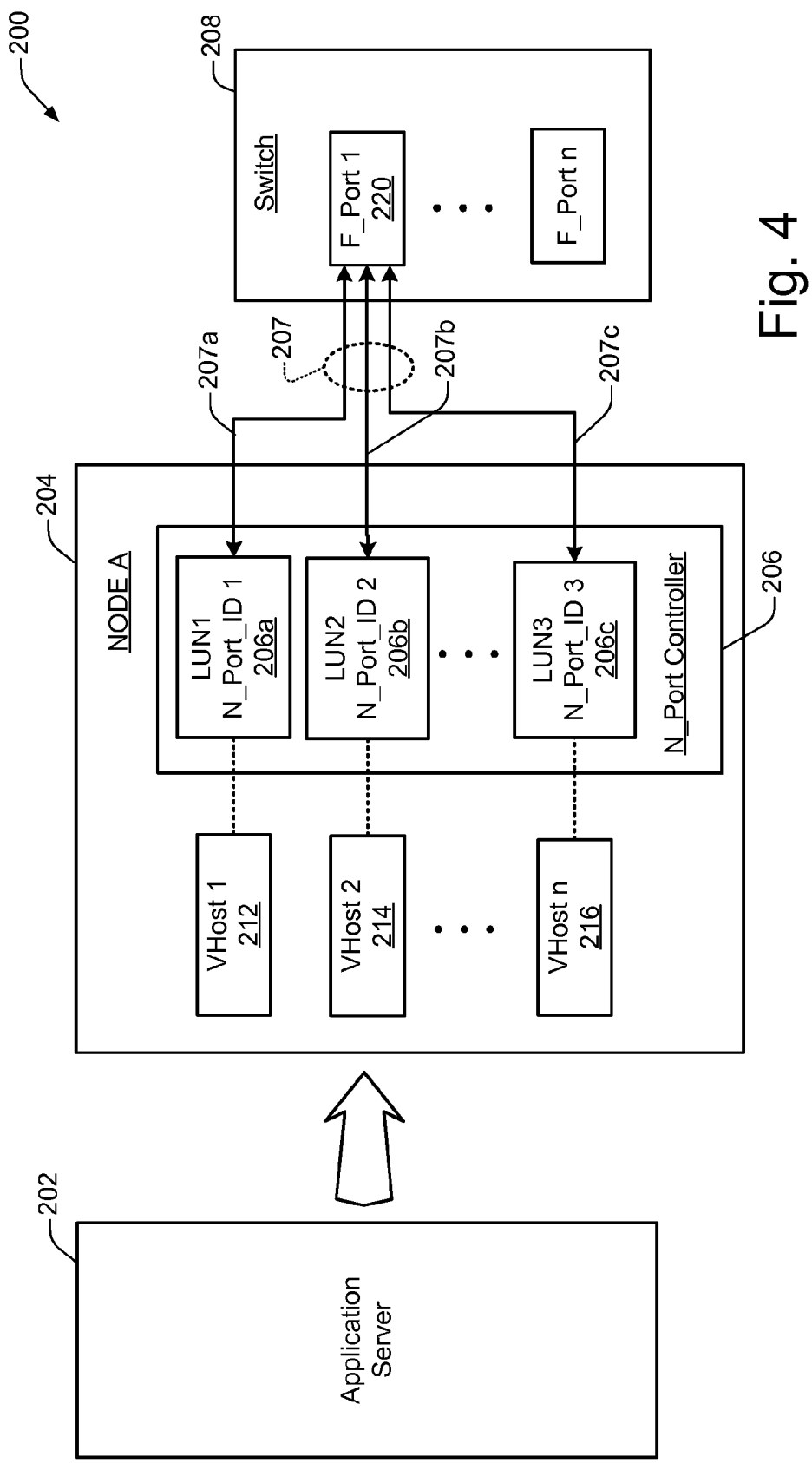
FIG. 4 is a block diagram showing various functional components of storage area network portion 200 in accordance with an embodiment of this invention.

FIG. 4 is a block diagram showing various functional components of storage area network portion 200 in accordance with an embodiment of this invention. In the example of FIG. 4, Node A 204 may include a plurality of virtual hosts (e.g., VHosts 212, 214, 216). For example, in one implementation, each VHost may correspond to a respective application (such as, for example, e-mail application, web application, print server application, etc.) implemented at Node A 204. According to a specific embodiment, some applications may be instantiated via Application Server 202. In the example of FIG. 4, each VHost may connect to the fabric using a respective virtual N_Port (e.g., 206a, 206b, 206c). In at least one implementation, each virtual N_Port may have associated there with a respective, unique virtual N_Port identifier. In at least one implementation, one or more of the virtual N_Ports may be implemented as trunking N_Ports whose functionality is similar to that of physical TN_Ports. Additionally, in at least one implementation, one or more of the virtual N_Ports may be implemented and/or managed using N_Port controller 206. In one implementation, N_Port controller 206 may have associated there with a physical N_Port and corresponding physical N_Port identifier. Although not illustrated in the example of FIG. 4, it is also possible for Node A to also include one or more physical hosts, in which each physical host has associated therewith a respective physical N_Port and physical N_Port identifier.

As illustrated in the example of FIG. 4, one or more of the virtual N_Ports 206a, 206b, 206c may be connected to a corresponding F_Port (e.g., F_Port 220) at switch 208 via one or more virtual links (e.g., 207a, 207b, 207c). In one implementation, the virtual links 207a, 207b, 207c may be implemented using a single physical link (e.g., 207) which connects the N_Port controller 206 to the F_Port 220 at switch 208. In one implementation, F_Port 220 may be implemented as a trunking F_Port (TF Port) in which each virtual N_Port connects to a respective virtual fabric (VSAN). In at least one implementation, each virtual N_Port may connect to a different virtual fabric via a common trunking F_Port.

In specific embodiments which employ the use of a virtualized server environment, instances of applications/servers may be dynamically created. In such embodiments, a virtual fabric (VF) enabled N_Port may be adapted to use one or more specified pools of N_Port_Names, which, for example, may be used for N_Port_ID virtualization and/or virtual fabrics support. In this way, it is possible for an N_Port_Name to be reused and associated over time to different application/server instances. In specific implementations, each of these instances may be adapted to operate in an appropriate Virtual Fabric. In at least one implementation, the virtualization layer may be adapted to be aware of the identities of the virtual fabric(s) to which the platform is connected, and further adapted to directly manage such identified virtual fabric(s).

Functional Design of TF_Port

The logical design of a TF_Port is generally similar to that of the TN_Port and mirrors its functionality in many ways. It supports multiple VSANs and may be viewed as creating a virtual interface for each separate VSAN, in the manner depicted for the TN_Port in FIG. 3. Each virtual interface may have the ability to apply a VSAN label to outgoing frames. And incoming VSAN frames are sorted to the individual virtual interfaces for separate handling. Generally, however, the F_Port virtual interfaces need not have the ability to handle FLOGI frames or provide as much support to higher level applications as is provided by the virtual Host interfaces at the TN_Ports, at least in some implementations.

In one embodiment detailed below, an F_Port becomes operational in TF_Port mode, if the attached Fibre Channel node supports EVFP services and the trunk mode configuration at both ends of the link allows trunking.

Additionally, in at least one embodiment detailed below, an F_Port and/or N_Port may become operational in N_Port Virtual Fabric Membership (NVFM) mode, if the attached Fibre Channel node supports NVFM services and the configuration parameters at both ends of the link allow communication using the NVFM protocol present invention.

SAN Communication Protocols

According to specific embodiments, each host or disk (e.g., N_Port) in Fibre Channel network may be required to perform explicit login into the storage fabric to be able to communicate in Storage Area Network (SAN). In virtual SAN environments, an N_Port may perform logins to multiple virtual SANs using the EVFP protocol standard, previously incorporated by reference.

According to the EVFP protocol standard (previously incorporated by reference), each N_Port is required to perform the following operations when performing login in a virtual SAN:

1. Perform FLOGI using the physical PWWN of the N_Port, indicating support for Virtual Fabric N_Port.
2. Perform Authentication (if required).
3. Initiate an Exchange Virtual Fabric Parameters (EVFP) protocol.
4. Perform FLOGI for each virtual PWWN on corresponding virtual fabrics. If successful, the F_Port may respond with an N_Port_ID relevant only in virtual fabric in which login was performed.

According to conventional techniques, the EVFP protocol only provides a framework to exchange the virtual fabric information. However, in such conventional techniques the decision of assigning the virtual fabric (e.g., VSAN) mappings to each PWWN is left to the N_Port controller.

An example of such a scenario is the case of a virtual SAN aware application server. The Fibre Channel network could be administratively configured to run all the E-mail traffic on a virtual fabric "VSAN1" and engineering applications on virtual fabric "VSAN2". So, application server needs to perform login of the E-mail application on "VSAN1" and Engineering application on "VSAN2". The actual task of login is done by N_Port controller. In order to login into the respective virtual fabrics the N_Port needs to assign a virtual PWWN to each of the applications. For example, the E-mail application may be assigned port name as PWWN1, and the Engineering application may be assigned port name as PWWN2.

The PWWN-VSAN mapping information which is provided from the N_Port to the F_Port (e.g., during the EVFP login process) is typically manually configured by the user or system administrator. This task of mapping the port name to the virtual fabric needs to be done for each application on every N_Port that can support EVFP protocol. Obviously, such requirements may be very difficult to manage, particularly if there are a relatively large number of such N_Ports in the fabric.

In at least one implementation, the technique of the present invention overcomes the above-described limitations of the EVFP protocol by providing a mechanism which enables F_Ports to dynamically assign VSAN associations to N_Ports (or TN_Ports), including N_Ports/TN_Ports which are adapted to support the EVFP protocol. As described in greater detail below, such a mechanism may obviate the need to manually configure the PWWN-VSAN mapping information at the network nodes.

Typically application servers or database servers run on Hosts (e.g., N_Ports) that use storage through the SAN. These application servers interact with the storage network using the N_Port controller. The administration and management of these N_Port controllers are usually tied with the management of the application servers which is typically outside the administrative domain of the networks. Since the virtual fabric ID or VSAN is a property of the network, the present inventive entity recognizes that it may be desirable in at least one implementation to configure the PWWN/NWWN mapping to the virtual fabric inside network.

Moreover, according to specific embodiments, N_Port-VSAN (or Host-VSAN) associations may be dynamically determined and assigned at one or more F_Ports based on selected criteria such as, for example: PWWN, NWWN, FCID, QoS criteria, node ID, OUI (Organization Unique Identifier), vendor specific information, and/or any other information or criteria which can be passed to the F_Ports via the FC fabric. For purposes of illustration and simplified explanation, it is assumed in the examples below that the N_Port-VSAN (or Host-VSAN) associations are dynamically determined and assigned at one or more F_Ports based on the PWWN parameters associated with each Host/N_Port. However, it will be appreciated that other embodiments of the present invention may utilize other criteria (such as, for example, NWWN, FCID, QoS criteria, node ID, OUI, vendor specific information, and/or any other information or criteria which can be passed to the F_Ports via the FC fabric) for performing automatic and dynamic VSAN assignments for selected N_Ports.

In at least one embodiment of present invention, the dynamic assignment of port VSAN membership may be achieved using a modified version of the Dynamic Port VSAN Membership (DPVM) mechanism described, for example, in U.S. patent application Ser. No. 11/261,426 entitled "DYNAMIC PORT VSAN MEMBERSHIP FUNCTIONAL AND DESIGN SPECIFICATION" by Ramaswamy et al., filed on Oct. 27, 2005 (previously incorporated herein by reference in its entirety for all purposes, and referred to herein as the "DPVM feature" or the "DPVM Patent Application").

According to a specific embodiment, the DPVM feature provides a mechanism for allowing users to configure the virtual fabric ID (e.g., VSAN) for a given N_Port based on selected criteria such as, for example, the N_Port's PWWN or NWWN. For example, in one implementation, when the DPVM feature is used to configure an N_Port's PWWN-VSAN (or NWWN-VSAN) association(s), the N_Port may be logged into the correct virtual fabric regardless of the F_Port's virtual fabric membership. As a result, whenever this N_Port or device is moved (e.g., due to management or failure reasons) the N_Port will be able to automatically log into the appropriate virtual fabric or VSAN, as administratively configured by the user.

As described in greater detail below, one aspect of the present invention relates to an N_Port Virtual Fabric Membership (NVFM) mechanism which, for example, provides one or more of the following features: (1) allowing N_Port-VSAN associations to be dynamically determined and assigned at one or more F_Ports, based on selected criteria such as, for example: PWWN, FCID, QoS criteria, node ID, OUI, vendor specific information, etc.; and (2) allowing a single port (e.g., F_Port) and associated link to carry traffic for multiple different virtual groups of network devices (e.g., multiple VSANs).

In one implementation, the N_Port Virtual Fabric Membership (NVFM) mechanism may be implemented as a protocol which provides a framework for the N_Ports to query VSAN(s) for the logical N_Ports logging into virtual fabric. In one implementation, such a framework shifts the responsibility of mapping the PWWN-VF_ID (VSAN) configurations from the N_Port controller to the network fabric. Additionally, in at least one implementation, the NVFM mechanism enables the use of the DPVM feature for F_Ports supporting the EVFP protocol.

According to a specific embodiment, implementation of the NVFM mechanism may be achieved by modifying aspects of the DPVM feature and the EVFP protocol, and integrating such modified aspects in order to allow the NVFM mechanism to be implemented as a protocol which is compatible with the EVFP protocol standard.

In accordance with at least one embodiment of the present invention, it may be preferable that the identities of the Virtual Fabric IDs (VSANs) be managed and administered via the network or fabric. Additionally, in at least one embodiment, it may be preferable for the virtualization layer to be aware of the virtual fabric. In one implementation, the determination of the appropriate VSAN to be mapped to a given PWWN may be administered centrally through the fabric, as described, for example in the DPVM Patent Application.

In at least one implementation, the NVFM mechanism of the present invention may reduce or eliminate the need for users to configure EVFP-enabled N_Ports, for example, by allowing the fabric to handle the virtual fabric (VSAN) mapping of PWWNs. For example, in one embodiment, the NVFM mechanism may be adapted to access and/or manage VSAN mapping information stored in a database (e.g., DVPM database), and make such VSAN mapping information available to the N_Port controller(s). Such information may be used by the N_Port controller(s) to correctly identify the appropriate virtual fabric(s) needed to perform logins for one or more of the virtual PWWNs.

Device Implementation

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch, particularly a Fibre Channel switch. Such network devices may have multiple network interfaces including frame relay and ISDN interfaces, for example.

For example, the methods of this invention may be implemented in specially configured network devices such as the MDS 9000 family of switches manufactured by Cisco Systems, Inc. of San Jose, Calif. A generalized architecture for some such machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 5:
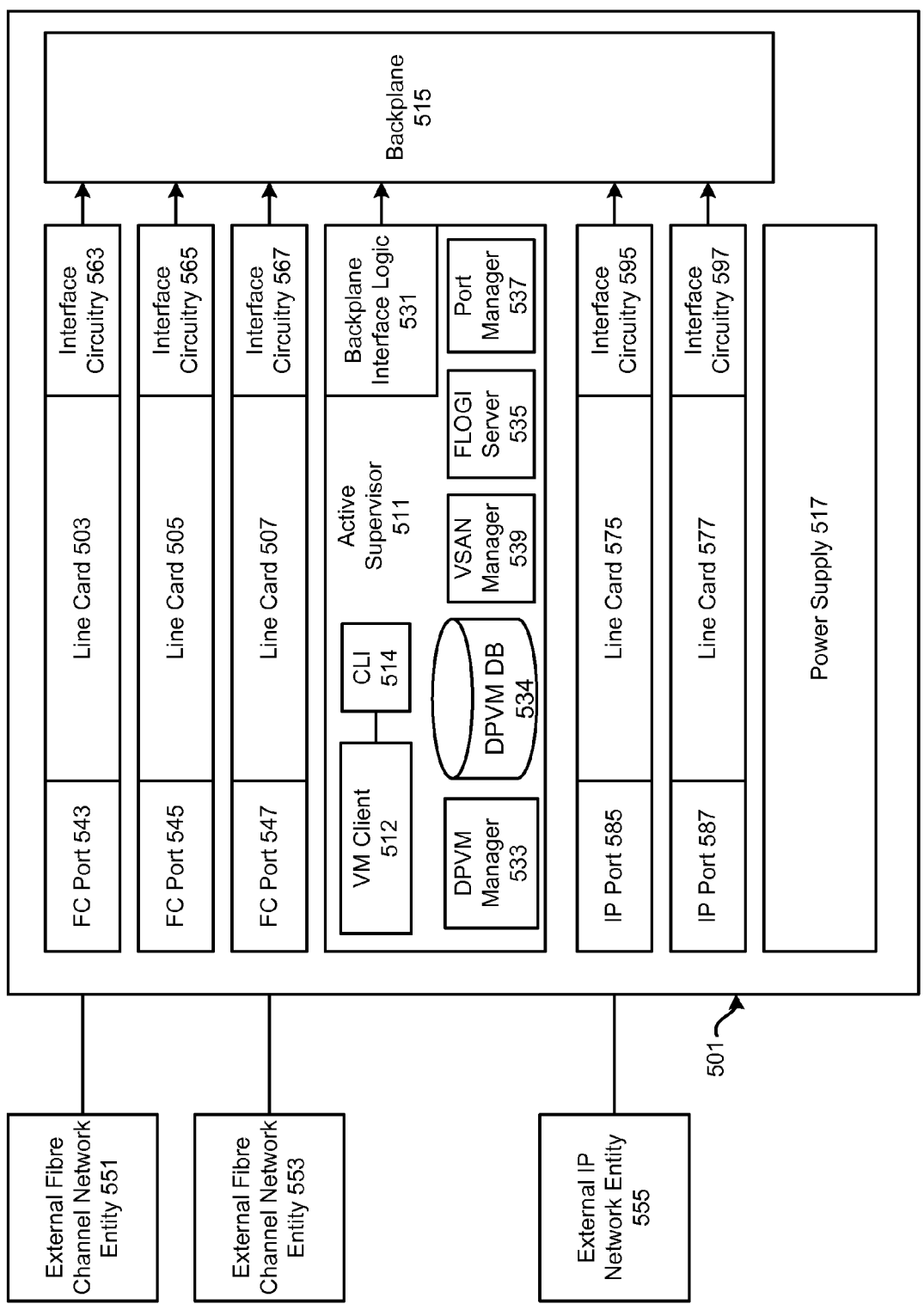
FIG. 5 is a diagrammatic representation of one example of a fibre channel switch 501 that can be used to implement techniques of the present invention.

FIG. 5 is a diagrammatic representation of one example of a fibre channel switch 501 that can be used to implement techniques of the present invention. Although one particular configuration will be described, it should be noted that a wide variety of switch and router configurations are available. The switch 501 may include, for example, at least one interface for communicating with one or more virtual manager(s). In at least one implementation, the virtual manager may reside external to the switch, and may also be accessed via a command line interface (CLI). The switch 501 may include at least one interface for accessing external metadata information.

The switch 501 may include one or more supervisors 511 and power supply 517. According to various embodiments, the supervisor 511 has its own processor, memory, and/or storage resources. Additionally, the supervisor 511 may also include one or more virtual manager clients (e.g., VM client 512) which may be adapted, for example, for facilitating communication between the virtual manager 502 and the switch.

Line cards 503, 505, and 507 can communicate with an active supervisor 511 through interface circuitry 563, 565, and 567 and the backplane 515. According to various embodiments, each line card includes a plurality of ports that can act as either input ports or output ports for communication with external fibre channel network entities 551 and 553.

The backplane 515 can provide a communications channel for all traffic between line cards and supervisors. Individual line cards 503 and 507 can also be coupled to external fibre channel network entities 551 and 553 through fibre channel ports 543 and 547.

External fibre channel network entities 551 and 553 can be nodes such as other fibre channel switches, disks, RAIDS, tape libraries, or servers. The fibre channel switch can also include line cards 575 and 577 with IP ports 585 and 587. In one example, IP port 585 is coupled to an external IP network entity 555. The line cards 575 and 577 also have interfaces 595 and 597 to the backplane 515.

It should be noted that the switch can support any number of line cards and supervisors. In the embodiment shown, only a single supervisor is connected to the backplane 515 and the single supervisor communicates with many different line cards. The active supervisor 511 may be configured or designed to run a plurality of applications such as routing, domain manager, system manager, port manager, FLOGI server, utility applications, etc. The supervisor may include one or more processors coupled to interfaces for communicating with other entities.

According to one embodiment, the routing application is configured to provide credits to a sender upon recognizing that a packet has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

In at least one implementation, the active supervisor 511 may also include one or more of the following modules: CLI/SNMP interface 514, Port Manager 537, DPVM Manager 533, DPVM Database 534, FLOGI Server 535, etc. Functionalities relating to at least a portion of these modules are described, for example, in FIG. 6.

According to a specific embodiment, DPVM Manager 533 may be configured or designed to perform the one or more of the following functions: maintaining user and operational configuration of the DPVM database; distributing the DPVM database information across switches in a SAN fabric; generating notifications and updates whenever there is change in the DPVM database; etc.

According to a specific embodiment, FLOGI Server 535 may be configured or designed to perform one or more of the following functions: processing of the fabric logins (FLOGI) performed by the N_Ports (including NL_Ports); FCID assignment; program hardware to enable frame transmission and reception in appropriate virtual fabrics; etc.

According to a specific embodiment, VSAN Manager 539 may be configured or designed to perform the one or more of the following functions: maintaining configuration and operational status of VSANs in the switch; generating VSAN configuration and operational state change notifications which, for example, may be used by other control plane applications to appropriately change their states and/or program hardware; etc.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

According to specific embodiments of the present invention, a volume may be generally defined as collection of storage objects. Different types of storage objects may include, for example, disks, tapes, memory, other volume(s), etc.

Figure 6:
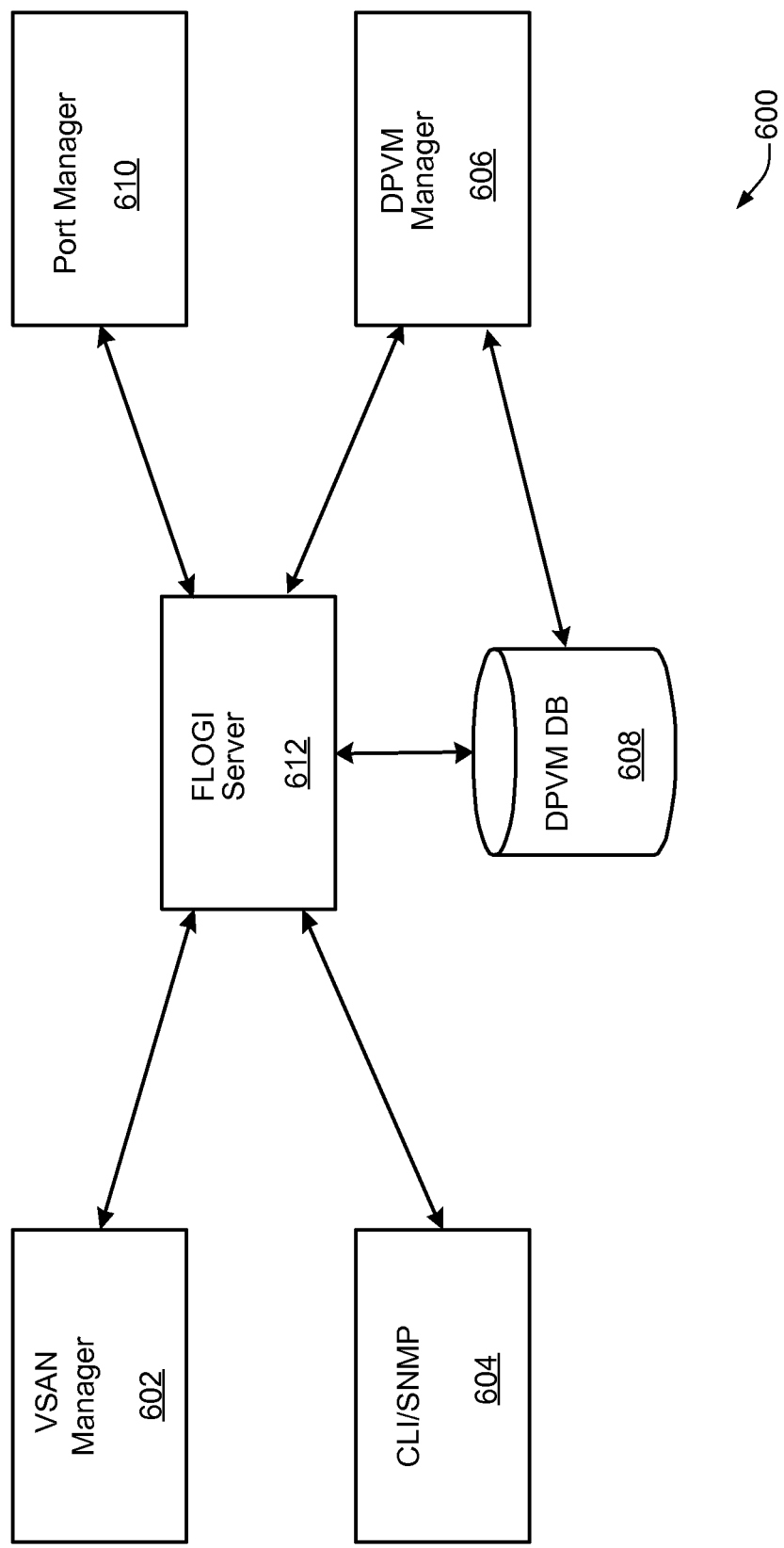
FIG. 6 shows an example of FLOGI Server interactions with other services on a fabric switch platform.

FIG. 6 shows an example of FLOGI Server interactions with other services on a fabric switch platform. At least a portion of the various modules and services illustrated in FIG. 6 are described below. In at least one implementation, at least a portion of the NVFM protocol may be performed by the FLOGI Server (e.g., 539, FIG. 5). Additionally, according to a specific embodiment, the CLI/SNMP interface 604 may be configured or designed to facilitate configuration changes and display of desired status information.

Port Manager 610 may be configured or designed to control default F_Port-VSAN assignments and manage F_Port configurations and/or operations. Port Manager 610 may also be configured or designed to provide a means to reinitialize dynamic ports. This may be required, for example, to effect DPVM DB change during DPVM DB activation and/or DPVM disable. According to a specific embodiment, if a port is operating in dynamic VSAN mode, then the Port Manager may ignore static port VSAN configuration changes. Additionally, the Port Manager may coordinate with FLOGI server 612 to program linecard components with static port VSAN configurations, for example, if the dynamic port configuration mechanism is shutdown.

FLOGI server 612 may be configured or designed to query DPVM DB 608 (e.g., during FLOGI) in order to acquire information relating to the dynamic VSAN assignment for the designated F_Port. FLOGI server may also coordinate with Port Manager 610 to automatically and dynamically program linecard components with the dynamic VSAN assignments before bringing the F_Port up and sending FLOGI ACC to the device requesting login. According to a specific implementation, FLOGI server may also provide a means to query existing logged in devices. Additionally, FLOGI server may also be configured or designed to send device login/logout notifications as required, such as for example, for one or more of the following purposes: to create/delete autolearnt entries in DPVM DB; to create/delete internal table of active devices; etc.

In at least one implementation, the DPVM Server 606 may be configured or designed to listen to device login/logout notifications from the FLOGI server, and respond appropriately. The DPVM Server 606 may also be configured or designed to keep track of information from VSAN Manager 602 relating to VSAN create/delete/suspend operations. The DPVM Server 606 may also notify the VSAN Manager to create static port VSAN configuration entries as appropriate.

VSAN Manager 602 may be configured or designed to provide a mechanism for programming static port VSAN configurations. This may be required, for example, at the time of DPVM disable and/or Database deactivation where dynamic VSAN of a port is converted to static port VSAN. Conventionally, each F_Port of a fabric switch may be configured at initialization to be associated with a respective, default VSAN. The default VSAN assignments are typically statically configured by a system administrator.

Configuration Protocol Detection

As indicated, to setup an NVFM-enabled N_Port of this invention, the node and fabric ports should preferably agree on a set of parameters for their link. To accomplish this, they may employ a common protocol for the setup. Thus, as an initial matter, the ports may determine that their peer is prepared to communicate using such common protocol. Examples of such protocols include: FC-LS protocol, EVFP protocol, NVFM protocol of the present invention, the FC SW-ILS request response based protocol, etc. As indicated above, the EVFP protocol may be enabled as a registration/set-up protocol for NVFM-enabled N_Ports. One procedure for detecting EVFP capability will now be described. In this procedure, if EVFP capability is not detected, then the peer node port and switch port do not use a VSAN-specific communication for any set-up or data traffic purposes. In this case, there will be no negotiation of VSAN parameters. And in the embodiment depicted in FIG. 3, all subsequent communication from the NVFM-enabled N_Port may take place via the physical HBA interface.

On the other hand, if EVFP capability is detected, then the NVFM-enabled N_Port and the F_Port subsequently negotiate appropriate VSAN parameters for future data traffic. As indicated elsewhere, this may entail determining common features for the link including the mode of operation, a particular port VSAN (for non-trunking applications), and a list of common VSANs to be supported by the link. Other link-related parameters may be negotiated at this time as well.

Figure 7:
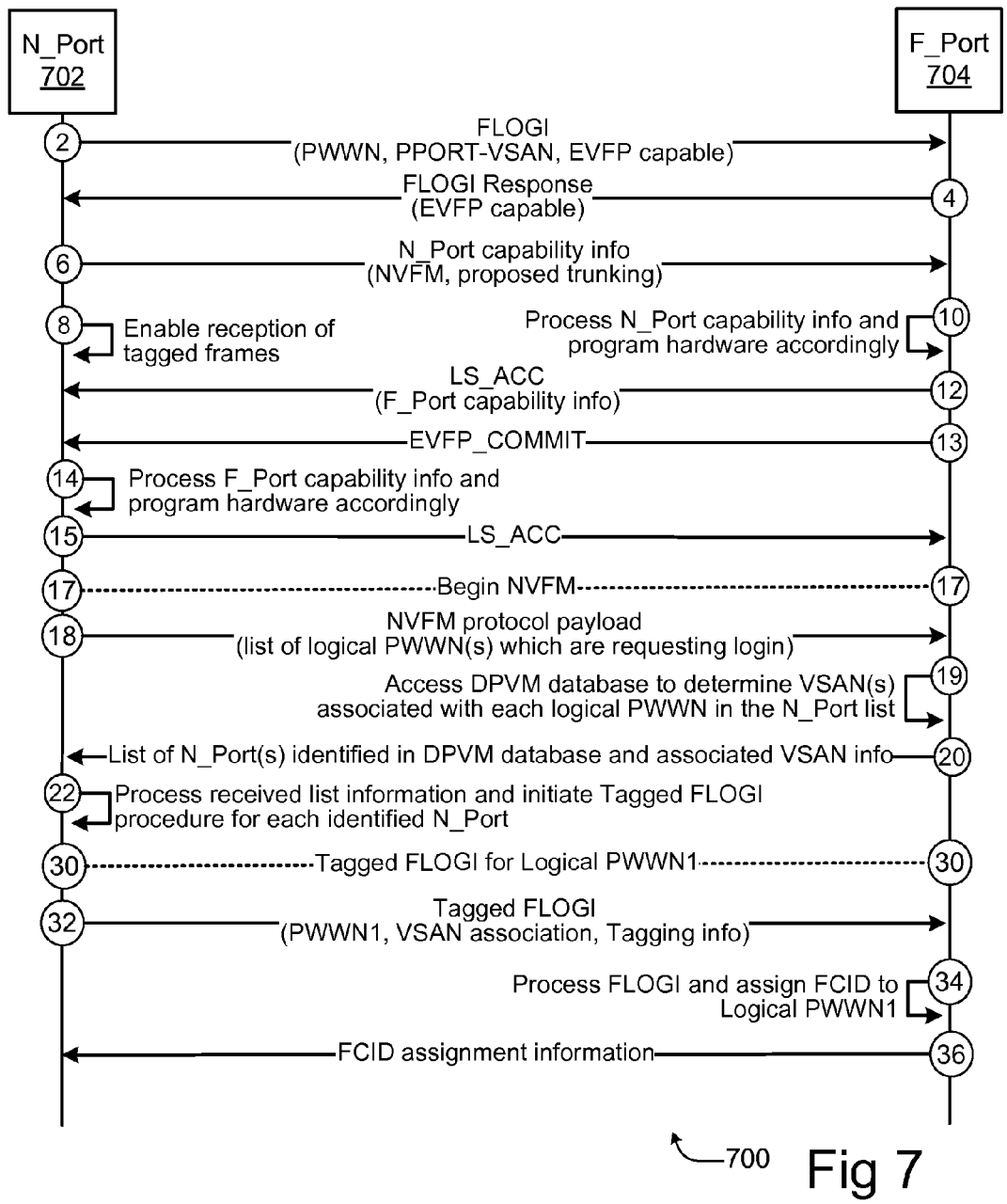
FIG. 7 is an interaction diagram depicting, at a relatively high level, some interactions between an NVFM-enabled F_Port and an NVFM-enabled N_Port in setting up an NVFM link that supports multiple VSANs, in accordance with an embodiment of this invention.

One mechanism for detecting EVFP capability employs the Fibre Channel log in sequence, wherein the N_Port begins the process by sending an FLOGI. This implementation is depicted in FIG. 7. Because Fibre Channel requires the N_Port to send an FLOGI message after link initialization, EVFP detection can be conveniently implemented during this stage.

Configuration and Initialization

Various methods and functional designs may be employed to configure linked N_Ports and F_Ports for implementing various aspects of the NVFM technique of the present invention. In some embodiments, a three-phase procedure is employed. First, the N_Port determines whether the F_Port can communicate via a protocol intended to allow configuration. Assuming that the N_Port confirms this, the ports then use such protocol to negotiate parameter values needed to configure their link. Examples of such parameters may include, for example: modes of operation for the ports (trunking versus non-trunking; NVFM capability versus non-NVFM capability), number of VSANs supported, and identification of VSANs supported. Finally, after the negotiation is complete and the link VSANs are identified (if any), each individual virtual N_Port separately logs into the fabric (for its particular VSAN). Any other pre-login protocols, as applicable may be performed before the logins performed by individual virtual N_Ports. An example of this procedure is illustrated in FIG. 3.

FIG. 7 is an interaction diagram depicting, at a relatively high level, some interactions between an NVFM-enabled F_Port and an NVFM-enabled N_Port in setting up an NVFM link that supports multiple VSANs, in accordance with an embodiment of this invention.

As illustrated in the example of FIG. 7, the process may begin with NVFM-enabled N_Port 702 sending (2) a frame to F_Port 704 which includes an FLOGI request and associated information such as, for example, one or more of the following: the N_Port's PWWN ID; physical port-VSAN association information; EVFP capability information; etc. In response, F_Port 704 may send (4) an FLOGI response to N_Port 702. As illustrated in the example of FIG. 7, the FLOGI response includes EVFP capability information which indicates that the F_Port is configured with EVFP protocol capability.

At (6) N_Port 702 sends to F_Port 704 a frame which includes N_Port capability information such as, for example, NVFM capabilities, trunking (or tagging) capabilities, etc. In the example of FIG. 7, it is assumed that the N_Port capabilities include NVFM and trunking capabilities. Accordingly, the N_Port may propose to the F_Port the use of trunking (or at least some form of communication under a defined protocol for configuring trunking), and/or the use of an N_Port Virtual Fabric Membership (NVFM) protocol. Additionally, the N_Port 702 may configure appropriate hardware/software to enable (8) reception of tagged frames.

Upon receiving the N_Port capability information, F_Port 704 may process (10) the N_Port capability information and program its hardware accordingly. For example, the F_Port may enable reception/transmission of tagged frames (e.g., for trunking purposes), may program access lists for allowed VSANs, etc. As shown at (12), the F_Port may transmit to the N_Port a frame (e.g., LS_ACC) which includes F_Port capability information (e.g., NVFM capable, trunking capable, etc.). According to a specific embodiment, NVFM capability may be indicated by an N_Port sending an empty NVFM TLV message via the EVFP protocol. If the F_Port also supports NVFM capability, the F_Port may respond with a similar empty NVFM TLV message.

Additionally, the F_Port may also transmit to the N_Port an EVFP_Commit frame confirming that the F_Port can and will communicate using the EVFP protocol, which, for example, may be used for trunking purposes. Upon receiving the EVFP_Commit frame, the N_Port may process (14) the F_Port capability information and program its hardware accordingly. Additionally, the N_Port may respond by transmitting (15) a LS_ACC frame to the F_Port. At this point in the example of FIG. 7, use of the EVFP protocol may be initiated at both N_Port 702 and F_Port 704.

At (17) the NVFM setup phase begins. Note that if the N_Port has a functional design as illustrated in FIG. 3 or FIG. 4, the logic to send frames and interpret received frames may reside with the Physical HBA Interface 265 or with the physical N_Port controller 206. According to a specific embodiment, if no VSAN support has yet been confirmed, communication via a conventional HBA may be appropriate. Additionally, in at least one implementation, if the N_Port 702 and/or F_Port 704 is not configured to support NVFM capabilities, the NVFM setup phase may be skipped.

According to a specific embodiment, the NVFM protocol may be initiated after the EVFP protocol has completed and the N_Port has successfully negotiated the allowed virtual fabrics that are active on the link. Depending upon the particular protocol employed, a series of communications may be required to fully negotiate the NVFM parameter set(s) going forward. In the example of FIG. 7, several communications are intended to represent the NVFM negotiation phase of setup.

For example, according to a specific embodiment, during the NVFM setup phase, N_Port 702 may transmit (18) to F_Port 704 an ELS_NVFM message which includes an NVFM protocol payload comprising a list of logical PWWN(s)/NWWN(s) that the N_Port intends to login into the fabric. Thus, for example, the N_Port may provide the F_Port with a list of PWWNs and request the F_Port to provide corresponding VSAN IDs for one or more of the PWWN(s) in the list. In at least one implementation, the NVFM protocol payload may include other information (such as, for example, NWWN, FCID, QoS criteria, node ID, OUI, vendor specific information, and/or any other information or criteria which can be passed to the F_Ports via the FC fabric) which may be used by F_Port 704 to dynamically determine, identify and/or assign VSAN IDs associated with one or more physical and/or virtual devices/entities.

Using information from the list of logical PWWN(s) which are requesting login, the F_Port may access (19) at least one DPVM database in order to determine which VSAN(s) are associated with each logical PWWN in the N_Port list. After processing this information, the F_Port transmits (20) to the N_Port Port-VSAN information which, for example, includes a list of logical and/or virtual N_Port(s) identified in the DPVM database along with their associated VSAN information. Thus, for example, in at least one implementation, the Port-VSAN information may include a list of information pair(s) (e.g., PWWN-VSAN) for each PWWN that has been configured in a port membership database such as, for example, a Dynamic Port VSAN Membership (DPVM) database. In at least one implementation, the F_Port may also cache this list in order to provide functionality for updating the N_Port whenever there are any changes in any of the DPVM database(s).

At (22) the N_Port processes the received Port-VSAN information, and in response, may use the received Port-VSAN information for initiating one or more tagged FLOGI procedure(s) for one or more logical N_Ports identified in the received Port-VSAN list. This is illustrated, for example, in operations (30)-(36) of FIG. 7. In addition, in at least one implementation, the N_Port may also transmit a message to the F_Port to conclude the NVFM setup negotiations.

In the example of FIG. 7, it is assumed at (30) that the logical N_Port corresponding to logical PWWN1 (which, for example, is associated with physical N_Port 702) commences in initiating a tagged FLOGI procedure with F_Port 704. Accordingly, at (32) N_Port 702 sends to F_Port 704 a tagged FLOGI message for initiating a tagged FLOGI procedure for the logical N_Port corresponding to logical PWWN1. In at least one implementation, the tagged FLOGI message may include information related to the device or entity requesting the tagged FLOGI such as, for example: logical PWWN identifier information, VSAN association information, tagging information, etc. F_Port 704 processes (34) the tagged FLOGI request message, and assigns a unique FCID for the logical N_Port corresponding to logical PWWN1. Thereafter, the F_Port transmits (36) the FCID assignment information to the N_Port 702.

In at least one implementation, the tagged FLOGI set up procedures described at (30)-(36) of FIG. 7 may be implemented using the EVFP protocol or the NVFM protocol. Additionally, in at least one implementation, separate sessions of tagged FLOGI procedures may be initiated for each logical N_Port requesting login at F_Port 704. Thus, for example, referring to FIG. 4, virtual N_Ports 206a and 206b may each initiate a separate fabric login (FLOGI) procedure for its respective VSAN. Corresponding logic in F_Port 220 provides the fabric side of the login for each virtual N_Port.

In specific embodiments where one or more N_Ports support the EVFP protocol, the use of DPVM feature may be limited, for example, if an N_Port chooses a virtual fabric (VSAN) that is inconsistent with the DPVM database configuration. Such a situation may necessitate additional operations to be performed with respect to the virtual fabric configuration.

According to at least one embodiment, it is possible for only a subset of logical N_Ports to include associated VSAN information in the DPVM database. In one implementation, if the DPVM DB does not include information relating to a VSAN configuration for specified N_Port, that N_Port may be refused fabric login. Alternatively, virtual FLOGIs may be permitted for logical N_Ports that were not negotiated in the NVFM ELS N_Port list. In one implementation, if a the virtual N_Port identifier is not present in the DVPM database, the N_Port's VF_ID (VSAN) may be manually configured by user. In such a case, the N_Port may perform a virtual FLOGI using the VSAN specified by the user configuration.

Additionally, in at least one implementation, if a user or administrator subsequently updates the DPVM DB to include VSAN association/configuration information relating to the refused N_Port(s), then the F_Port(s) may automatically detect the new port-VSAN configuration information, identify the affected N_Port(s), and automatically notify selected devices (e.g., Host(s), N_Ports, etc.) of the updates to the DPVM DB, thereby allowing previously refused N_Ports to perform fabric login as new N_Ports.

Thus, for example, an F_Port may automatically initiate an NVFM protocol to notify appropriate devices whenever a change is detected in the DPVM database for: (1) one or more of the PWWN(s)/NWWN(s) that are currently logged in through that F_Port and/or (2) one or more of the PWWN(s)/NWWN(s) that were initially requested in one or more of the NVFM protocol payload(s). In this way, for example, an N_Port may use such information to perform logins for virtual N_Ports that were initially refused fabric login. In one implementation, the F_Port may be configured or designed to initiate NVFM protocols whenever VSAN state changes (e.g., VSAN suspend, no suspends, etc.) are detected. Additionally, as described in greater detail below, the NVFM protocol may be used to integrate with a graceful shutdown feature for one or more N_Ports.

Figure 9:
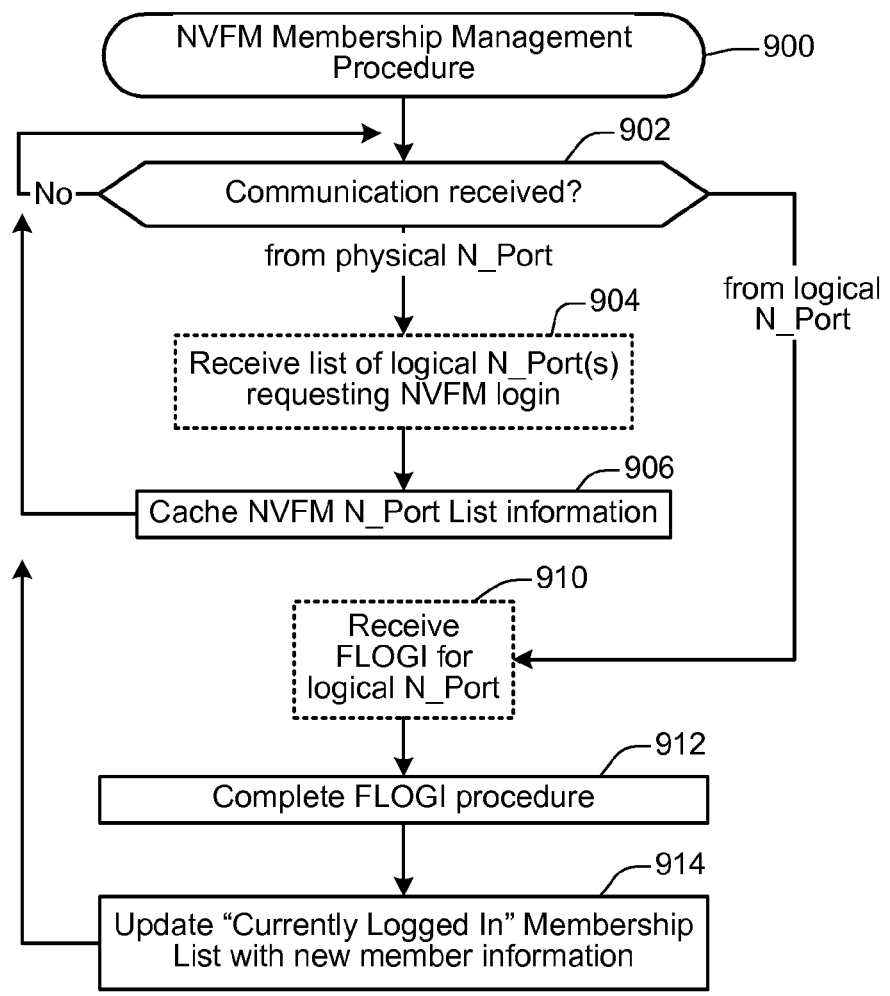
FIG. 9 shows a flow diagram of an NVFM Membership Management Procedure 900 in accordance with a specific embodiment of the present invention.

FIG. 9 shows a flow diagram of an NVFM Membership Management Procedure 900 in accordance with a specific embodiment of the present invention. In at least one implementation, portions of the NVFM Membership Management Procedure 900 may be performed or implemented by one or more modules of a fabric switch such as, for example, FLOGI server 535 of FIG. 5. According to a specific embodiment, the NVFM Membership Management Procedure 900 may be used for updating and maintaining desired information which, for example, may be cached in memory at a fabric switch.

According to a specific implementation, when a communication is received (902) at a fabric switch of the present invention, the communication is analyzed to determine an appropriate response. For example, if the communication was received from a physical N_Port and includes a list of logical N_Ports requesting NVFM login (904), the switch may respond by storing or caching (906) the received NVFM login N_Port list information. In one implementation, such information may include, for example, interface ID information, information relating to logical PWWN identifiers corresponding to the logical N_Ports requesting NVFM login, etc. Additionally, in one implementation, such information may be stored or cached in local memory at the FLOGI server. In at least one embodiment, such information may be organized on a per-F_Port basis. For example, in one implementation, the cache may be implemented as a "per interface" cache and updated when NVFM has been negotiated with the N_Port. According to a specific embodiment, the cache may be cleared each time there is an NVFM ELS or link initialization.

Alternatively, if the communication was received from a logical N_Port and includes an FLOGI request from that logical N_Port (910), the switch may respond by completing (912) the FLOGI procedure, and updating (914), for example, a "Currently Logged In" membership list with new member information. In one implementation, such a membership list may include, for example, FLOGI information, port capability information, information relating to one or more service parameters, etc. In at least one embodiment, such information may be organized on a per-F_Port basis which, for example, may result in each F_Port having a respective, associated membership list.

Figure 10:
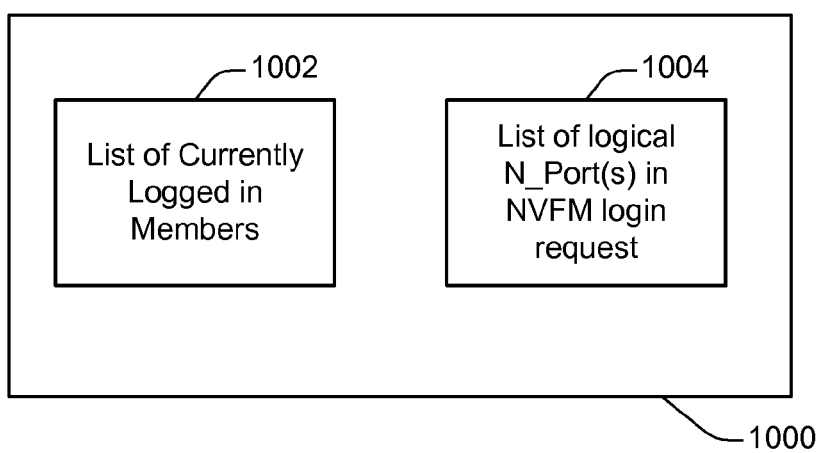
FIG. 10 shows an example of an FLOGI Server Cache 1000 in accordance with a specific embodiment of the present invention.

FIG. 10 shows an example of an FLOGI Server Cache 1000 in accordance with a specific embodiment of the present invention. As illustrated in the example of FIG. 10, cache 1000 may include a "Currently Logged In" membership list 1002 and associated information. In one implementation, list 1002 may include a list of logical and/or physical N_Ports that have performed FLOGI and are currently logged in at one or more F_Ports of one or more fabric switch(es). Additionally, as illustrated in the example of FIG. 10, cache 1000 may also include a "NVFM Login Request" list 1004 which may include information relating to logical N_Ports which have requested NVFM login at one or more specified F_Ports.

DPVM Database and Distribution

One of the features relating to the DPVM database may include, for example, an auto learning mechanism which may be adapted to recognize and/or identify existing and/or new login device(s), and populate the DPVM database accordingly. Another feature relates to different mechanisms for implementing DPVM database distribution. In one implementation, the DPVM DB may be configured using the switch CLI/SNMP/Fabric Manager.

Figure 8:
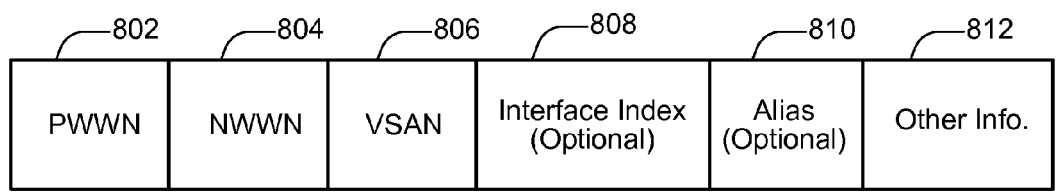
FIG. 8 shows an example of various types of information and parameters which may be included in a DPVM database entry or record 800 in accordance with the specific embodiment of the present invention.

According to a specific embodiment, the DPVM DB may be configured or designed to include one or more Device Mapping entries. For example, in one implementation, each Device Mapping entry may include a device PWWN/NWWN parameter along with the dynamic VSAN to be assigned to thereto. According to a specific embodiment, the DPVM database may be implemented as a global entity which is not maintained on a per VSAN basis. FIG. 8 shows an example of various parameters which may be included in a DPVM DB entry in accordance with a specific embodiment of the present invention.

FIG. 8 shows an example of various types of information and parameters which may be included in a DPVM database entry or record 800 in accordance with the specific embodiment of the present invention. For example, as illustrated in FIG. 8, DVPM DB record 800 may include a number of different parameters relating to a specific host (e.g., physical host, virtual host, etc.) or other device in the storage area network. Such parameters may include, for example, one or more of the following: a PWWN identifier 802, a NWWN identifier 804, a VSAN information 806, Interface Index information (e.g., port information) 808, alias information (e.g., a mapping alias) 810, and/or other information 812. In one implementation, the VSAN information 806 may include a VSAN identifier which is dynamically determined based upon other information in the DVPM DB record such as, for example, the PWWN and/or NWWN identifiers. In at least one implementation, the VSAN information 806 may be manually configured by an administrator, or automatically configured using prior FLOGI information and/or static F_Port-VSAN association information. Additionally, according to different implementations, the PWWN and/or NWWN identifiers may correspond to physical entities, logical entities, or some combination thereof.

According to a specific implementation, there may be at least two types of databases maintained by the DPVM Manager, which, for example, may include: an Active DPVM database and a Config DPVM database. According to a specific embodiment, the Active DPVM database may correspond to a particular DPVM database which is currently in effect, while the DPVM Config database may correspond to a DPVM database which is available for editing purposes. Changes to the Config database are not reflected in the Active database until activated. Having two different databases allows a user to create multiple entries, review the changes and then activate the whole database at one shot. It also reduces the possibility of a user ending up with a single incorrect database. It also facilitates in database distribution as the network usage is optimized.

As mentioned above, a user may activate the DPVM database for it to take effect. For example, upon an explicit activation, the Config database becomes the Active database. If this is not done, the current Config database may not take effect. According to a specific embodiment, database activation may fail if conflicting entries are found between the Config and currently Active database. However, a user can force activation to override conflicting entries.

In at least some embodiments, it may be useful to have the ability to automatically and dynamically populate the DPVM database, for example, by automatically learning currently logged and/or newly logging devices and their associated VSANs. This may be useful for the user to create a DPVM database quickly which he can later edit to create the exact database, if desired or required. According to specific embodiments, the autolearning feature of DPVM may include on or more of the following features:

- The DPVM autolearn feature may be turned off/on via one or more specified commands. Autolearnt entry may be created, for example, by populating device PWWN and VSAN to the DPVM Active Database.
- DPVM Active Database may be present if autolearn is to be turned on.
- Until the time autolearn is turned off by the user, autolearnt entries may be deleted, for example, from the DPVM Active Database by the user. In this way autolearnt entries are not permanent in the Active Database until autolearn is turned off.
- If a device logs out while autolearn is on, the device entry may be deleted from DPVM Active Database.
- If the same device logs multiple times into the switch through different ports, then the VSAN corresponding to a specified login (e.g., first login or last login) may be remembered and used for subsequent configuration.
- According to a specific embodiment, autolearnt entries do not override previously configured and activated DPVM entries.

According to a specific implementation, the DPVM autolearn mechanism may perform a variety of functions relating to one or more of the following: (a) autolearning currently logged in devices; (b) autolearning new devices logging in; etc. According to a specific embodiment, the autolearning of currently logged devices may occur substantially immediately, in real time, at the time autolearn is turned on. Additionally the autolearning of new devices may occur, for example, as and when new devices login to the switch.

Thus it will be appreciated that the NVFM protocol of the present invention may be useful even in cases where the user initially chooses to manually configure the N_Port-VSAN association, and subsequently enables the auto-learn feature in DPVM. For example, using the auto-learn feature of DPVM, the user desired mapping of the PWWN/NWWN to the VSAN may be cached by DPVM. This information may then be used by the NVFM protocol in subsequent N_Port logins which may be performed such as, for example, when the N_Port is moved around in network, when a restart on failure operation is performed, etc.

For providing improved plug and play capability to the user, it may be desirable for the DPVM database to be available on all (or selected) switches in the Fabric. In this way, a device may be moved anywhere in the fabric and still be automatically and dynamically assigned the appropriate VSAN association, thereby offering greatest flexibility to the user.

According to at least one embodiment, it may be preferable that the database distribution technique of the present invention be implemented in a manner such that the DPVM database is consistent across all switches in the Fabric. Additionally, in at least one implementation, it may be preferable to provide a scheme which has sufficient primitives available for the user to administer the database distribution.

Listed below are different examples for achieving DPVM database distribution in accordance with specific embodiments of the present invention.

1. Client-Server model: In this scheme, there may be two or more different entities such as, for example, a DPVM server and a DPVM Database server. In one implementation, the DPVM server may query the DPVM Database server every time it finds a matching PWWN entry. The DPVM Database server can exist anywhere in the Fabric. For reliable operation, there may be a primary and a secondary DPVM Database server configured by the user. The DPVM Database server can also be identified by a well-known FC2 address similar to Domain Controller address. Since the DPVM server queries the DPVM Database server, it may act as a client to the DPVM Database server. This scheme has a disadvantage that it may result in significant delays during FLOGI specially if the current primary becomes unreachable. If both primary and secondary become unreachable, then FLOGI cannot proceed at all, which is undesirable.

2. Client Server model with local Caching: To counteract the problem(s) in the above-described Client-Server model scheme, the switch may be configured or designed to cache DPVM Database locally after querying the DPVM Database Server for the first time. Any changes in the DPVM database can then be notified/propagated asynchronously or learnt by regularly polling the Database Server.

3. Fully Distributed model: In this scheme, each DPVM server learns the DPVM Database from each of its neighboring switches, for example, during ISL bring-up. While merging local and remote databases, it is possible that some conflicts are detected, and the DPVM server may choose to shutdown the ISL after logging the appropriate reason for further analysis by the user. In one implementation, a DPVM database conflict will not result in a link isolation (e.g., shutdown of the ISL). For example, if the database changes locally due to configuration by the user, the DPVM server may be configured to notify all its neighboring switches so that the database is updated at all switches in the Fabric. Note that this scheme is similar to the Zone Server database distribution model.

According to a specific embodiment, and information distribution mechanism such as, for example, the CFS (Cisco Fabric Service) mechanism may be used for implementing various aspects of DPVM database distribution. For example, in specific embodiments where the DPVM Database is not implemented on per VSAN basis, CFS physical distribution may be used to distribute DPVM database information to all or selected switches in the Fabric.

In at least one implementation, the N_Port controller may be notified and/or updated when DPVM database has been detected as being modified or updated. This gives the N_Port opportunity to perform logins for the virtual N_Ports that may have been previously denied login. In one implementation, the F_Port may be configured or designed to initiate an EVFP_ELS message to update N_Port of changes, whenever a DPVM database change is detected.

According to a specific embodiment, when the DPVM database is updated or modified, the N_Port controller may be required to log out if the DPVM VSAN does not match the virtual VSAN. Additionally, one or more affected F_Ports may be re-initialized in such scenario(s).

Modification of Network Configurations During Operation

It will be appreciated that various F_Port, N_Port and/or Host Bus Adaptor (HBA) modes of operation are described herein. The particular mode(s) of operation may be governed by the current states of the node and fabric ports. For example, the switchport state may or may not support the chosen communication protocol for negotiating VSAN services on the link (e.g., EVFP, NVFM, etc.). Further, the current NVFM capability configurations may be different at the two ends. Thus, the particular mode adopted at any time may be determined by the current configuration of the fabric switchport(s). The physical N_Port(s) and/or logical N_Port(s) may be configured to enable or disable virtual VSAN support based on the applications supported by the HBAs and/or virtual Hosts. If, for example, the supported and active applications do not require VSAN differentiation, then it may be appropriate to disable virtual VSAN support.

Additionally it will be appreciated that various modifications to the network configuration may occur while the network is online. For example, one or more network devices may be physically reconfigured, virtual fabric configurations may be modified, etc. Such modifications may affect one or more operational aspects of the storage area network. Accordingly, in at least one implementation, the technique of the present invention includes a variety of mechanisms for automatically and dynamically detecting changes in network configurations and/or network conditions, and for automatically and dynamically initiating appropriate actions in response to the detected changes in the network configurations/conditions.

Figure 11:
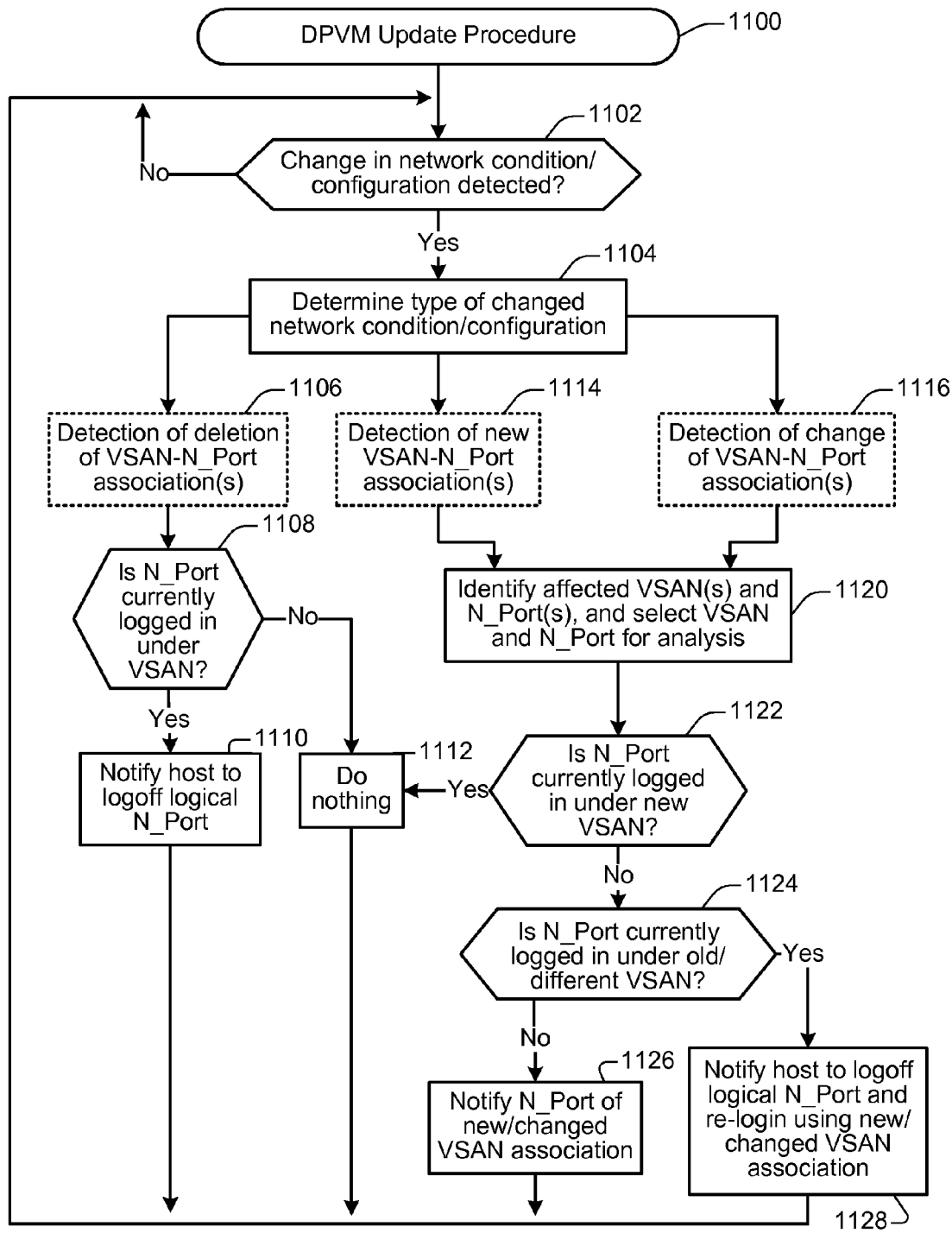
FIG. 11 shows a flow diagram of a DPVM Update Procedure 1100 in accordance with a specific embodiment of the present invention.

FIG. 11 shows a flow diagram of a DPVM Update Procedure 1100 in accordance with a specific embodiment of the present invention. In at least one embodiment, at least a portion of the DPVM Update Procedure 1100 may be implemented by the FLOGI server 535 of FIG. 5.

As described in greater detail below, one feature of the DPVM Update Procedure 1100 relates to a mechanism for automatically detecting and responding to changes in network conditions and/or changes in network configurations. For example, as illustrated in FIG. 11, when a change in a network condition/configuration is detected (1102), the type of changed network condition/configuration may be determined (1104) for initiating an appropriate response. For example, as described in greater detail below, the type of changed network conditions may relate to: detection of a deletion of one or more VSAN-N_Port association(s); detection of one or more new VSAN-N_Port association(s); detection of a modification of one or more current VSAN-N_Port association(s); etc. For purposes of illustration, it is assumed in the examples below that the changed network condition relates to a single VSAN-N_Port association.

As illustrated in FIG. 11, if the changed network condition/configuration relates to the detection of a deletion of a VSAN-N_Port association (1106), the affected VSAN and logical N_Port may be identified, and an operation and may be performed to determine (1108) whether the identified logical N_Port is currently logged in at the identified VSAN. If so, the DPVM Update Procedure may notify (1110) the host of the identified logical N_Port to logoff the identified logical N_Port. Alternatively, if it is determined that the identified logical N_Port is not currently logged in at the identified VSAN, the DPVM Update Procedure may chose to do nothing (1112).

If the changed network condition/configuration relates to the detection of a new VSAN-N_Port association (1114), the new VSAN and logical N_Port may be identified (1120), and an operation and may be performed to determine (1122) whether the identified logical N_Port is currently logged in at the new VSAN. If so, the DPVM Update Procedure may chose to do nothing (1112). However, if it is determined that the identified logical N_Port is not currently logged in at the new VSAN, another operation and may be performed to determine (1124) whether the identified logical N_Port is currently logged in at different VSAN. If so, the DPVM Update Procedure may notify (1128) the host of the identified logical N_Port to logoff the identified logical N_Port from its current VSAN, and perform a new FLOGI to login at the new VSAN. Alternatively, it is determined that the identified logical N_Port is not currently logged in at different VSAN, the DPVM Update Procedure may notify (1126) the identified logical N_Port of the new VSAN association. In response, the logical N_Port may automatically initiate an FLOGI procedure for logging in to the new VSAN.

If the changed network condition/configuration relates to the detection of a changed or modified VSAN-N_Port association (1116), the old VSAN, new (or changed) VSAN, and logical N_Port may be identified (1120), and an operation and may be performed to determine (1122) whether the identified logical N_Port is currently logged in at the new VSAN. If so, the DPVM Update Procedure may chose to do nothing (1112). However, if it is determined that the identified logical N_Port is not currently logged in at the new VSAN, another operation and may be performed to determine (1124) whether the identified logical N_Port is currently logged in at the old or different VSAN. If so, the DPVM Update Procedure may notify (1128) the host of the identified logical N_Port to logoff the identified logical N_Port from its current VSAN, and perform a new FLOGI to login at the new VSAN. Alternatively, it is determined that the identified logical N_Port is not currently logged in at different VSAN, the DPVM Update Procedure may notify (1126) the identified logical N_Port of the new VSAN association. In response, the logical N_Port may automatically initiate an FLOGI procedure for logging in to the new VSAN.

Figure 12:
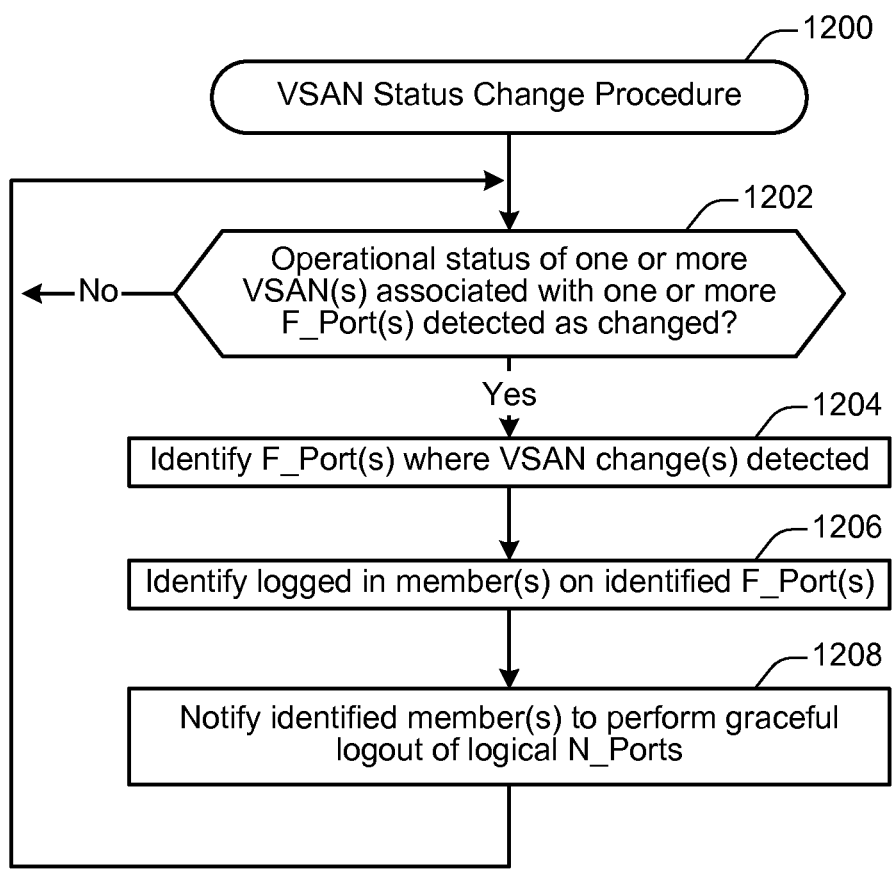
FIG. 12 shows a flow diagram of a VSAN Status Change Procedure 1200 in accordance with a specific embodiment of the present invention.

FIG. 12 shows a flow diagram of a VSAN Status Change Procedure 1200 in accordance with a specific embodiment of the present invention. In at least one embodiment, at least a portion of the VSAN Status Change Procedure may be implemented by the VSAN Manager. In at least one implementation, the VSAN Status Change Procedure may be utilized for detecting and responding to operational status changes of VSANs which may be associated with one or more F_Ports. Examples of VSAN operational status changes may include a VSAN going offline, a VSAN coming online, a VSAN getting deleted, etc.

As shown in FIG. 12, when a change is detected (1202) in the operational status of one or more VSANs (that are associated with one or more F_Ports), the F_Port(s) which may be affected by the VSAN operational status change(s) are identified (1204). Using this information, the members (e.g., host, physical PWWN, etc.) which are currently logged in to the identified F_Port(s) are identified (1206), and notification may be sent (1208) to each (or selected) of the identified members to perform a graceful logout of their respective logical N_Ports which are currently logged in to the identified VSANs.

Features and Advantages

It will be appreciated that the NVFM technique of the present invention provides a number of features, benefits and advantages over conventional virtual fabric membership techniques. Examples of at least some of the features, benefits and advantages of the NVFM technique of the present invention are described briefly below (at least a portion of which may also have been described in greater detail previously). According to different embodiments, the NVFM technique of the present invention may provide one or more of the following features, benefits and/or advantages:

- A mechanism for allowing N_Ports to perform automated queries (e.g., to an F_Port) in order to obtain VSAN association information relating to one or more logical N_Ports that will be requesting login into one or more virtual fabrics (e.g., via the F_Port).
- A mechanism for N_Ports to automatically determine the identity of the virtual fabric (VSAN) to which the N_Port should log in.
- A mechanism to update N_Ports about VSAN state changes associated with the PWWN/NWWN that are currently logged in or attempted to log in.
- Using the NVFM technique of the present invention, end users do not need configure the VSAN associated with PWWN and/or NWWN on every N_Port that supports the ELS_EVFP protocol.
- Using the NVFM technique of the present invention, a user/administrator is not required to configure (or reconfigure) VF_IDs (e.g., VSANS) each time a network device (e.g., host, disk, etc.) is moved around in fabric or physically reconfigured in the fabric.
- Using the NVFM protocol of the present invention, N_Port administrators may manually configure desired port-VSAN mappings just once inside the fabric, and then such mappings would be available whenever an N_Port performs re-login, restart and/or changes its physical location the network.
- According to a specific implementation, NVFM for a given N_Port may be invoked after successful completion of the EVFP ELS, and before N_Port performs FLOGI in virtual fabrics.
- NVFM need not prevent the use other mechanisms for determining the appropriate VSAN for a given N_Port to perform login. In at least one implementation, the NVFM technique of the present invention may be used in conjunction with such other mechanisms without conflict.
- NVFM need not mandate all the virtual N_Ports to use the NVFM protocol. For example, the NVFM technique of the present invention may be used for only a subset of virtual or logical N_Port logins via a given physical N_Port.
- According to specific embodiments, one or more F_Port(s) of the present invention may be configured or designed to initiate the NVFM protocol of the present invention upon the detection of one or more of the following conditions and/or events: detection of DPVM database changes (e.g., activation, de-activation, updates); detection of one or more VSAN state changes; detection of graceful shutdown procedures being initiated; etc.
- Integration with the schemes such as Virtual Links and/or Ex-Rdy to thereby provide per VF_ID (VSAN) flow control. For example, according to specific embodiments, the MDS platform may be configured or designed to create virtual links within a single physical link that operate as completely independent forwarding links. Currently, Fibre Channel uses a buffer-to-buffer (B2B) credit mechanism to implement flow control. This mechanism uses R-Rdy to indicate that a buffer is available to accept frames. The Ex-Rdy scheme may be used to provide an enhancement to do this flow control on a virtual link basis. In one implementation, the NVFM technique of the present invention may be adapted to integrate with this feature by dynamically assigning the logical/virtual N_Ports to the right virtual link based on the VSAN. According to a specific embodiment, the B2B credit reported in response to the FLOGI request may be set based, at least partially, on the dynamically assigned virtual link based VSAN determined through the use of NVFM protocol.
- According to a specific implementation of the DPVM feature, the mapping between an application (or OS) and an N_Port may be statically configured. Such an implementation may be useful in situations where only one application (or OS) runs over a given N_Port.

OTHER EMBODIMENTS

While the invention has been particularly shown and described with reference to specific embodiments thereof, it will be understood by those skilled in the art that changes in the form and details of the disclosed embodiments may be made without departing from the spirit or scope of the invention.

For instance, while the above protocol has been described with respect to NVFM capability for N_Port and F_Port applications, it may be easily extended to work with devices attached to loop ports if such protocol is supported by the respective device vendors. Further this invention may be extended to network technologies other than Fibre Channel. Considering these and other variations, the scope of the invention should be determined with reference to the appended claims.

According to specific embodiments, the technique of the present invention may be implemented in storage area networks and devices thereof which the support the EVFP ELS protocol. Such devices may include, for example: MDS 9000 family of switches; family of data center switches (e.g., DC3); etc.

This application incorporates by reference, in its entirety and for all purposes, U.S. patent application Ser. No. 10/430,491, (U.S. Publication No. US-2004-0100910-A1, published May 27, 2004), filed May 5, 2003 and titled, METHODS AND DEVICES FOR EXCHANGING PEER PARAMETERS BETWEEN NETWORK DEVICES, by Desai et al.

This application incorporates by reference, in its entirety and for all purposes, U.S. patent application Ser. No. 10/034,160, (U.S. Publication No. US-2003-0118053-A1, published Jun. 26, 2003), filed Dec. 26, 2001, titled METHODS AND APPARATUS FOR ENCAPSULATING A FRAME FOR TRANSMISSION IN A STORAGE AREA NETWORK, by Gai et al., which is incorporated herein by reference for all purposes. This application is also related to U.S. patent application Ser. No. 10/979,886, (U.S. Publication No. US-2006-0092932-A1, published May 4, 2006), filed Nov. 1, 2004, titled TRUNKING FOR FABRIC PORTS IN FIBRE CHANNEL SWITCHES AND ATTACHED DEVICES, by GHOSH et al., which is incorporated herein by reference for all purposes.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

It is claimed:

1. A method for automatically responding to changing conditions in a storage area network, the method comprising:
   detecting by a network device a first network change event, wherein the first network change event relates to a modification of a configuration of a first VSAN-N_Port association;
   determining a type of the first network change event;
   identifying a first N_Port of the first VSAN-N_Port association, wherein the first VSAN-N_Port association includes at least one N_Port configured for use in a respective virtual storage area network;
   identifying a first VSAN of the first VSAN-N_Port association;
   determining that the first N_Port is logged in at the first VSAN based on, at least in part, the type of the first network change event;
   identifying a first F_Port associated with the first VSAN;
   identifying a first member that is logged in to the first VSAN via the first F_Port; and
   transmitting instructions to a host of the first N_Port or a first member logged into the first VSAN via the first N_Port to perform a logoff operation.

2. The method of claim 1, further comprising:
   identifying a second N_Port of a second VSAN-N_Port association;
   identifying a second VSAN of the second VSAN-N_Port association; and
   in response to determining that the second VSAN-N_Port association has been deleted, performing a second action.

3. The method of claim 2, further comprising:
   determining whether the second N_Port is currently logged into the second VSAN;
   wherein performing the second action includes notifying a host of the second N_Port to perform a logoff operation of the second N_Port from the second VSAN in response to a determination that the second N_Port is currently logged into the second VSAN.

4. A Fibre Channel switch in a storage area network, the Fibre Channel switch comprising:
   at least one processor;
   at least one first F_Port configured or designed to provide an interface to at least one other network device in the storage area network; and
   memory;
   the switch being operable to:
   detect by a network device a first network change event, wherein the first network change event relates to a modification of a configuration of a first VSAN-N_Port association;
   determine a type of the first network change event;
   identify a first N_Port of the first VSAN-N_Port association, wherein the first VSAN-N_Port association includes at least one N_Port configured for use in a respective virtual storage area network;
   identify a first VSAN of the first VSAN-N_Port association; and
   ascertain that the first N_Port is logged in to the first VSAN based on, at least in part, the type of the first network change event; and
   transmit instructions to a host of the first N_Port or a first member logged in to the first VSAN via the first N_Port to perform a logoff operation in response to the detection of the first network change event.

5. The Fibre Channel switch of claim 4 wherein the type of the first network change event indicates that the first VSAN-N_Port association has been deleted.

6. The Fibre Channel switch of claim 4 being further operable to:
   determine whether the first N_Port is currently logged into a second VSAN which is different from the first VSAN.

7. The method of claim 1, further comprising:
   determining whether the first N_Port is currently logged into a second VSAN which is different from the first VSAN.

8. A method for automatically responding to changing conditions in a storage area network, the method comprising:
   detecting by a network device a first network change event, wherein the first network change event relates to a modification of a configuration of a first VSAN-N_Port association;
   determining a type of the first network change event;
   identifying a first N_Port of a first VSAN-N_Port association, wherein the first VSAN-N_Port association includes at least one N_Port configured for use in a respective virtual storage area network;
   identifying a first VSAN of the first VSAN-N_Port association;
   determining that the type of the first network change event indicates that the first VSAN-N_Port association is new;
   determining that the first N_Port is logged in at the first VSAN based on, at least in part, the type of the first network change event;
   transmitting instructions to a host logged into the first VSAN via the first N_Port or first member logged into the first VSAN via the first N_Port that instruct the host or first member to perform a first action.

9. The method of claim 8, further comprising:
   determining whether the first N_Port is currently logged into a second VSAN which is different from the first VSAN.

10. The method of claim 8, further comprising:
    identifying a first F_Port associated with the first VSAN;
    identifying the first member that is logged in to the first VSAN via the first F_Port; and
    transmitting instructions to the identified first member to perform the first action in response to the detection of the first network change event.

11. A method, comprising:
    detecting by a network device a first network change event, wherein the first network change event relates to a modification of a configuration of a first VSAN-N_Port association;
    determining a type of the first network change event;
    identifying a first N_Port of a first VSAN-N_Port association, wherein the first VSAN-N_Port association includes at least one N_Port configured for use in a respective virtual storage area network;
    identifying a first VSAN of the first VSAN-N_Port association;

determining by a network device that the type of the first network change event indicates that the first VSAN-N_Port association has been deleted;

determining by the network device whether the first N_Port is currently logged into the first VSAN based on, at least in part, the type of the first network change event; and notifying by the network device a host of the first N_Port, wherein notifying includes sending instructions to the host to instruct the host to perform a logoff operation of the first N_Port from the first VSAN in response to a determination that the first N_Port is currently logged into the first VSAN.

12. The Fibre Channel switch of claim 4, the switch being operable to perform further steps, comprising:

identify a first F_Port associated with the first VSAN;

identify a first member that is logged in to the first VSAN via the first F_Port;

wherein performing an action includes transmitting instructions to the identified first member to perform a first action in response to the detection of the first network change event.

* * * * *